United States Patent
Tanaka et al.

(10) Patent No.: US 7,072,613 B2
(45) Date of Patent: Jul. 4, 2006

(54) WIRELESS COMMUNICATION MEDIUM PROCESSING APPARATUS AND WIRELESS COMMUNICATION MEDIUM PROCESSING SYSTEM

(75) Inventors: Masahiko Tanaka, Fukuoka (JP); Hiroshi Yoshinaga, Kasuya-gun (JP); Futoshi Deguchi, Fukuoka (JP); Yoshitaka Mizoguchi, Fukuoka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 11/065,287

(22) Filed: Feb. 25, 2005

(65) Prior Publication Data

US 2005/0184154 A1 Aug. 25, 2005

(30) Foreign Application Priority Data

Feb. 25, 2004 (JP) .............................. 2004-049666

(51) Int. Cl.
*H04B 7/185* (2006.01)

(52) U.S. Cl. .................. 455/13.3; 455/101; 455/562.1; 455/78; 455/71; 455/412.1; 375/219; 375/347; 375/211; 375/267; 343/719; 343/742; 343/847

(58) Field of Classification Search ................ 455/411, 455/412.1, 412.2, 22, 71, 562.1, 78, 567.1, 455/13.3; 370/342, 334, 335, 315; 375/219, 375/347, 211, 267
See application file for complete search history.

(56) References Cited

U.S. PATENT DOCUMENTS

| | | | | |
|---|---|---|---|---|
| 5,745,479 A | * | 4/1998 | Burns et al. ................. | 370/245 |
| 5,930,243 A | * | 7/1999 | Parish et al. ................ | 370/334 |
| 6,058,106 A | * | 5/2000 | Cudak et al. ................ | 370/313 |
| 6,144,848 A | * | 11/2000 | Walsh et al. ................ | 455/419 |
| 6,149,353 A | * | 11/2000 | Nilsson ....................... | 455/409 |
| 6,157,612 A | * | 12/2000 | Weerackody et al. ....... | 370/215 |
| 6,172,970 B1 | * | 1/2001 | Ling et al. ................... | 370/347 |
| 6,178,196 B1 | * | 1/2001 | Naguib et al. .............. | 375/148 |
| 6,240,098 B1 | * | 5/2001 | Thibault et al. ............ | 370/431 |
| 6,466,567 B1 | * | 10/2002 | Lomp et al. ................. | 370/342 |

FOREIGN PATENT DOCUMENTS

| | | |
|---|---|---|
| JP | 2001 043326 | 2/2001 |
| JP | 2003 162696 | 6/2003 |
| JP | 2004 227315 | 8/2004 |

* cited by examiner

*Primary Examiner*—Marceau Milord
(74) *Attorney, Agent, or Firm*—Stevens, Davis, Miller & Mosher, LLP

(57) ABSTRACT

This invention is a wireless communication medium processing apparatus which carries out communication with a wireless communication medium, to carry out at least one of reading and writing as to information which was stored in the wireless communication medium, and has a plurality of antenna, a transmission divider which was connected to the plurality of antennas, and a reception compositor which was connected to the plurality of antennas, and is characterized in that the transmission divider divides an inputted signal to output the plurality of antennas, and the reception compositor combines signals from the plurality of antennas and outputs it.

44 Claims, 22 Drawing Sheets

WIRELESS COMMUNICATION MEDIUM PROCESSING APPARATUS AND WIRELESS COMMUNICATION MEDIUM PROCESSING SYSTEM

BACKGROUND OF THE INVENTION

1. Field of the Invention

This invention aims to provide a wireless communication medium processing apparatus and a wireless communication medium processing system which are of a very few apparatus, equipment configuration, and are optimum on the occasion of carrying out recognition of an ID code etc. simultaneously by carrying out reading, or writing, or reading/writing simultaneously with a single or a plurality of wireless communication media, in a wire area, or a number of different places.

2. Description of the Related Art

For the purpose of authentication and destination sorting of baggage and so on, it has become frequent to use a wireless communication medium having an ID code, such as an IC card and an IC tag, and a wireless communication medium processing apparatus for carrying out ID code authentication. When a communication mounted medium exists within a communication range of a communication mounted medium processing apparatus, an induced voltage is generated on an antenna which a wireless communication medium has, due to a magnetic field from the antenna, and this voltage is rectified and electric power and transmission data are supplied. In the wireless communication medium to which electric power was supplied, a switch is turned ON, OFF, in accordance with data which was read out from a memory mounted, for example, by a modulation circuit which is composed of a load resistance and a switch which were connected to the antenna, in accordance with 1, 0 of data. By this ON, OFF, there occurs load fluctuation to an antenna which the wireless communication medium has, and this load fluctuation is transmitted to an antenna on the side of a communication medium processing apparatus, as a signal. The transmitted signal is demodulated, and its ID code authentication is carried out (e.g., see, JP-A-2003-162696 publication).

At this time, in case of carrying out in/out authentication by use of a wireless communication medium such as an IC tag and an IC card, at a plurality of gateways which exist on a floor of an office building, there is such a case that communication with a wireless communication medium has to be realized in a very wide area, such as ID authentication due to communication with a wireless communication medium, at a number of places in an inside of a building.

On this account, for example, in order to carry out communication with a wireless communication medium in a very wide place, there is such a method that a very large side antenna is installed.

Alternatively, there is such a system that a number of wireless communication medium processing apparatuses, in each of which an antenna and a reading/writing section were combined, are installed, and these are all connected to and processed by a host which controls them in a concentrated manner (e.g., see, JP-A-2001-43326 publication).

FIG. 22 is a block diagram of a wireless communication medium processing apparatus in prior art.

As apparent from FIG. 22, this conventional wireless communication medium processing apparatus requires a number of reading/writing sections, and various control mechanisms are required such as synchronous control between these.

Alternatively, studied is such a system that a plurality of antennas are installed at a number of places, and antennas, which carry out communication with a wireless communication medium is switched arbitrarily, exclusively and processed, through a reading/writing section which is also used as a host, an antenna changeover switch which switches over which antenna is connected, among these antennas.

FIG. 23 is a block diagram of a wireless communication medium processing apparatus in prior art.

As apparent from FIG. 23, in this conventional wireless communication medium processing apparatus, there is such a necessity that an antenna to be connected is switched over sequentially and used.

Further, proposed are a device in which a plurality of antennas are connected to one reading/writing section and which carries out distribution on a transmission side and combining on a reception side, and so on. In addition, proposed are a device in which one reading/writing section is connected to a plurality of antennas for the purpose of expanding a communication range of an antenna, but the reading/writing section has a plurality of demodulation sections, and so on.

However, in conventional wireless communication medium processing apparatus and wireless communication medium processing system, a configuration for realizing communication with a wireless communication medium in a very wide area such as an office building and a large size shop, or at a plurality of places in this wide area has the following problems.

Firstly, in case that a size of an antenna was enlarged in order to cover a very wide area, there was such a problem that it is unrealistic and difficult to form an antenna with a size for covering, for example, an entire floor of a building, in a phase of its manufacturing, cost, strength etc.

For example, in a case described in FIG. 22, in case that a number of apparatuses, in each of which an antenna and a reading/writing section were combined, are disposed, and are connected to a host which controls them in a concentrated manner, a number of expensive reading/writing sections are required, and therefore, there is such a problem that a wireless communication medium processing apparatus becomes very too expensive. Further, each reading/writing section operates asynchronously and independently, and therefore, there was such a problem that, on the occasion that an ID code, which ware read out from a wireless communication medium through each antenna, is communicated from a reading/writing section to a host, it is out of synchronization, and erroneous recognition due to collision of data occurs. In addition, there is such a necessity that a plurality of reading/writing sections as electronic devices are disposed, and therefore, there occurred such a problem that, when any one of these reading/writing sections fails to operate properly, communication with a wireless communication medium becomes impossible at all, at a certain place. These synchronizing processing (i.e., phase lag of a signal to be processed between reading/writing sections with each other) etc. are big problems both in transmission and in demodulation, and collision occurs in case of reading a number of wireless communication media, etc., and there was such a problem that a tremendous processing circuit becomes necessary in order to avoid this.

Further, in a case described in FIG. 23, there was such a problem that, in case that a plurality of antennas are connected to a reading/writing section through an antenna changeover switch, individual antennas are switched over, and therefore, an antenna, which becomes active and is enabled to communicate with a wireless communication medium, is determined exclusively, and therefore, it is not possible to have all antennas operated simultaneously. For example, even in case that each antenna was disposed at a number of gateways which exist on an office floor, there was such a problem that it is not possible to carry out ID authentication by communication with a wireless communication medium at a plurality of gateways simultaneously. By this means, there was such a problem that it is simply possible to configure only a system which is disadvantageous and inconvenient.

Further, in case that a plurality of antennas were activated simultaneously in an antenna changeover switch, there is such a problem that RF signals, which were received by respective antennas, collide with each other, and it is not possible to carry out accurate demodulation in a reading/writing section, and adversely, there is such a problem that a transmission signal from the reading/writing section also causes a collision, and is not transmitted to each antenna accurately, and there was such a problem that it is not possible to carry out accurate communication with a wireless communication medium.

Further, in case of switching over an antenna to be activated by the antenna changeover switch, it is actually unknown that a wireless communication medium exists in a communication range of which antenna, and therefore, there is such a necessity that an antenna to be activated is switched over in sequence, in order to realize communication with a wireless communication medium as to which it is unknown where it exists, and processing is complicated. Alternatively, in case that a wireless communication medium moves, even if an antenna to be activated was switched over in sequence, a wireless communication medium does not exist in a communication range of an antenna which is activated for all time, and there was also such a problem that it is not possible to realize communication endlessly.

Further, there was also such a problem that noises are generated at the time of antenna switching.

SUMMARY OF THE INVENTION

The invention, in view of the above-described problems, aims to provide a wireless communication medium processing apparatus and a wireless communication medium processing system which realize in/out authentication which utilized a wireless communication medium at a number of gateways, recognition of a wireless communication medium which exists randomly in a wide area, etc., by use of a simple configuration, and can realize accurate demodulation, by avoiding influence of noise and a loss, even if transmission distribution and reception combining were carried out, and is a thing which sufficiently analyzed such problems that accurate demodulation, i.e., ID authentication could not be carried out by a conventional configuration, and solved these by use of artifice from various aspects.

This invention is a wireless communication medium processing apparatus which carries out communication with a wireless communication medium, to carry out at least one of reading and writing as to information which was stored in the wireless communication medium, and has a plurality of antenna, a transmission distributor which was connected to the plurality of antennas, and a reception compositor which was connected to the plurality of antennas, and is characterized in that the transmission distributor distributes an inputted signal to output the plurality of antennas, and the reception compositor combines signals from the plurality of antennas and outputs it.

According to this configuration, a signal is distributed by the transmission distributor and outputted to the plurality of antennas, and then, signals from the antennas are combined by the reception compositor and outputted. By this means, even in case that a reading/writing section is disposed in a wireless communication medium processing apparatus, there is no need to dispose a number of reading/writing sections, and it is possible to activate all antennas at the same time. Therefore, although it is a simple configuration, even in case that a wireless communication medium moves, it is possible to appropriately recognize that wireless communication medium.

In addition, the invention is a wireless communication medium processing apparatus which carries out communication with a wireless communication medium, to carry out at least one of reading and writing as to information which was stored in the wireless communication medium, characterized by having a plurality of antennas, a reception signal input selector which is connected to the plurality of antennas and selects a certain antenna from the plurality of antennas connected, and a wave detector which is disposed between the antenna and the reception signal input selector, and detects a wave detection signal from signals from some antenna which were selected by the reception signal input selector.

According to this configuration, a signal, which was received by a certain antenna, is detected as a wave detection signal, before it is inputted to the reception signal input selector, and the received signal is transferred as a low frequency wave detection signal. By this means, a signal, which was received by a certain antenna, is not transferred as a RF signal, and therefore, it is possible to lessen noises, over keeping all antennas to be inoperative. Therefore, it is possible to transmit a signal with few errors to the reading/writing section, without lowering electric power of the received signal, and it is possible to improve a communication distance.

DESCRIPTION OF THE PREFERRED EMBODIMENTS

Hereinafter, implementation modes of the invention will be described by use of drawings.

Meanwhile, the wireless communication medium in the invention is a medium which can carry out non-contact communication with a processing apparatus, such as a non-contact IC card, IC tag, ID tag, identification label, RF-ID tag, and the processing apparatus is an apparatus which carries out communication with these wireless communication media, and shows so-called reader, reader/writer, reading/writing apparatus.

In addition, the ID to be authenticated as the same kind means an ID in which a bit train, which represents an ID code, is fully matched, or which is judged as the same kind, although there is a different portion in part, and the ID to be authenticated as a different kind means an ID in which a bit train, which represents an ID code, is not matched, and which is judged as a different kind.

(Implementation Mode 1)

Figure 7:
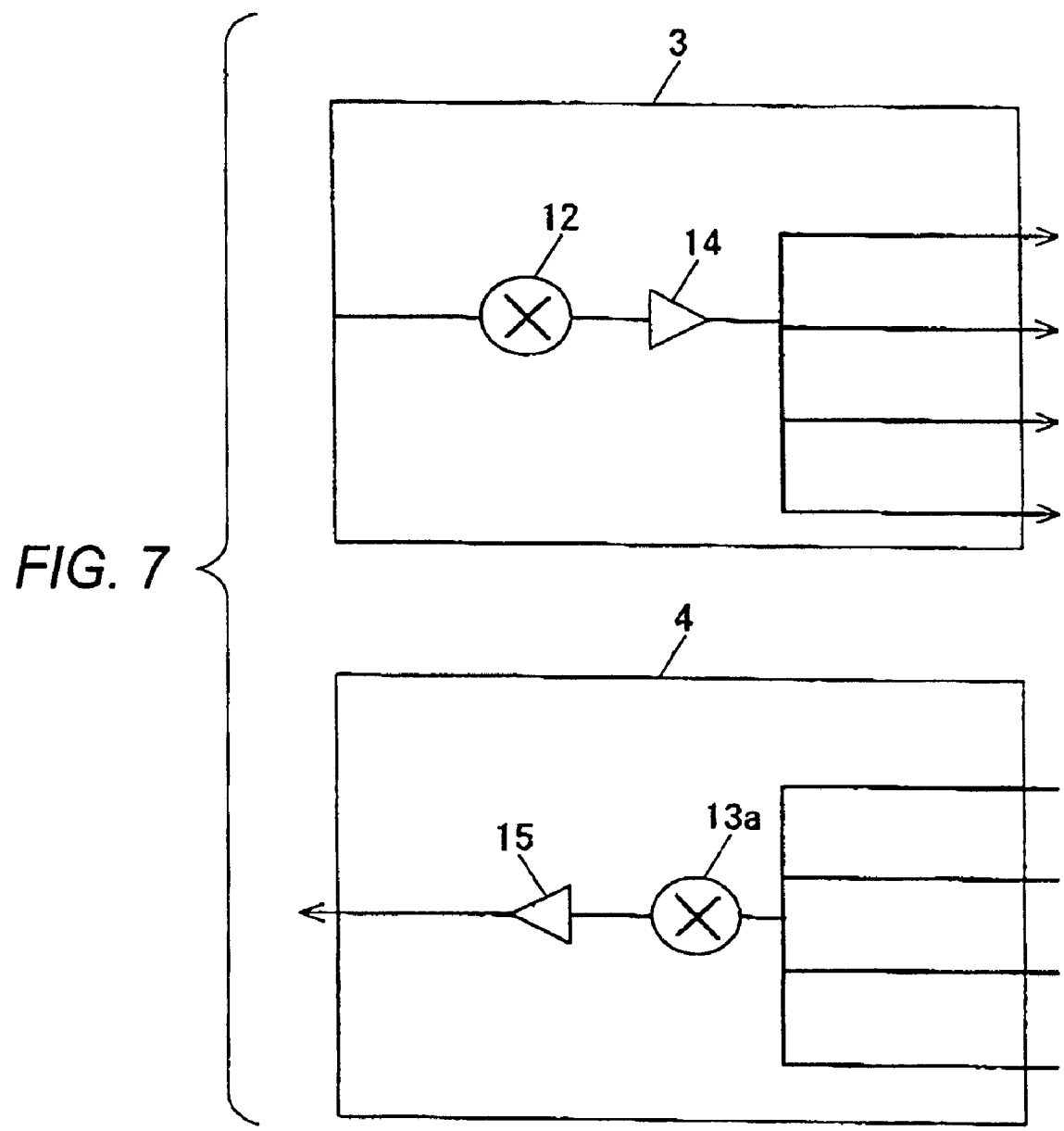
FIG. 7 is a block diagram of a part of the wireless communication medium processing apparatus in the implementation mode 1 of the invention
Figure 10:
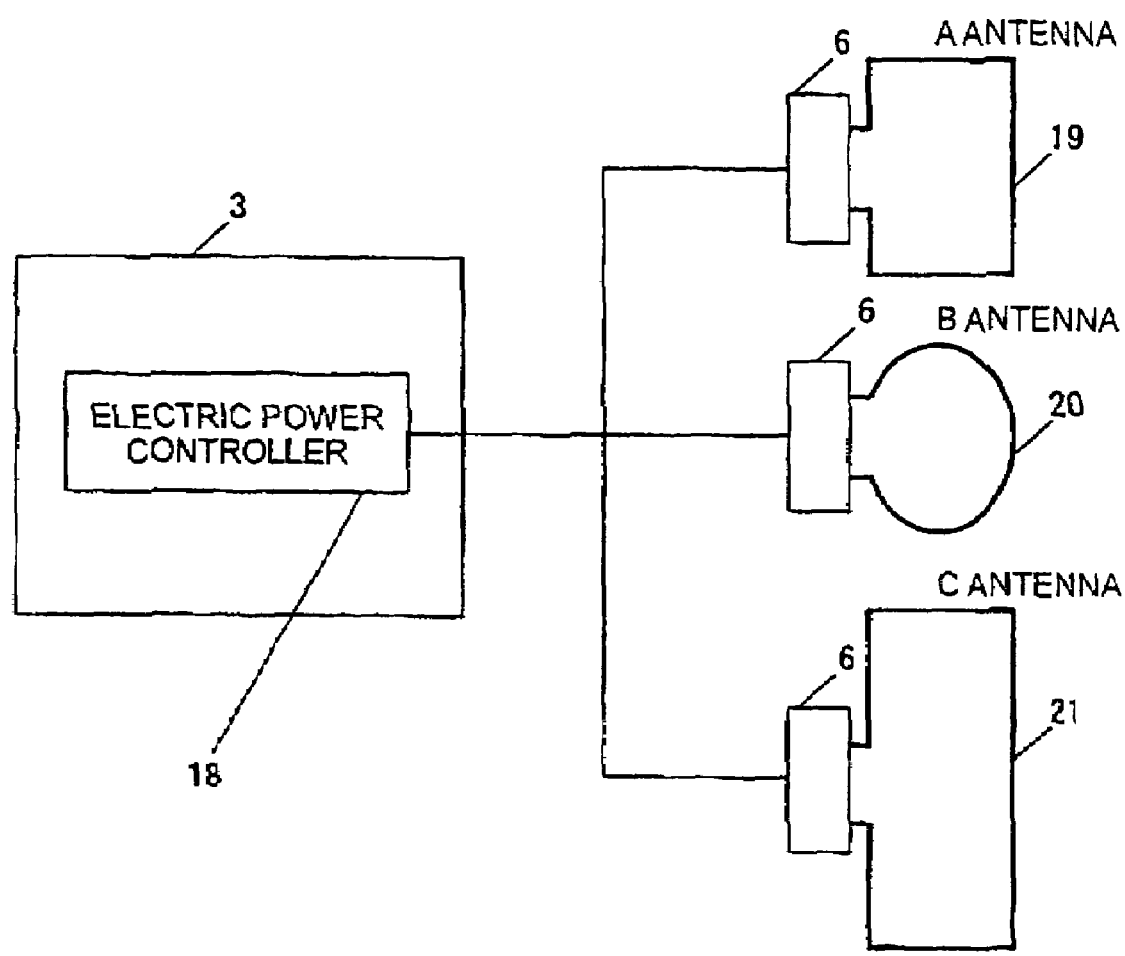
FIG. 10 is a block diagram of a part of the wireless communication medium processing apparatus in the implementation mode 1 of the invention
Figure 11:
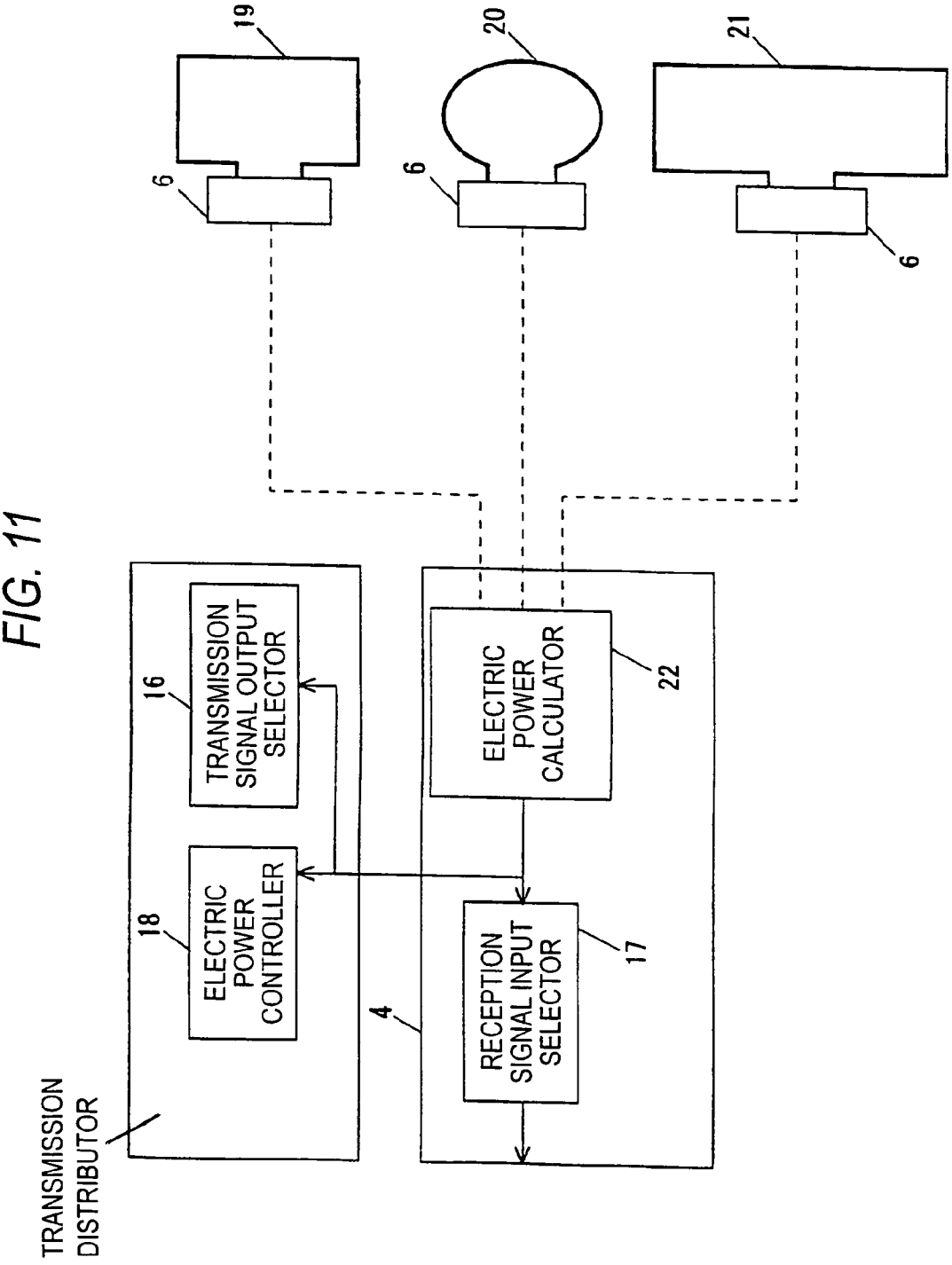
FIG. 11 is a block diagram of a part of the wireless communication medium processing apparatus in the implementation mode 1 of the invention

FIGS. 1, 4, 5, 7 are block diagrams of a wireless communication medium processing apparatus in an implementation mode 1 of the invention, and FIGS. 7, 10, 11 are block diagrams of a part of the wireless communication medium processing apparatus in the implementation mode 1 of the invention.

1 designates a wireless communication medium processing apparatus, and 2 designates a reading/writing section, and 3 designates a transmission distributor, and 4 designates a reception compositor, and 5 designates an antenna, and 6 designates an antenna circuit substrate, and 7 designates a transmission line, and 8 designates a reception line, and 9 designates a transmission main line, and 10 designates a reception main line, and 11 designates a wireless communication medium, and 12 designates a upconversion section, and 13 designates a wave detection section, and 13a designates a downconversion section, and 14 designates a transmission signal amplifier, and 15 designates a reception signal amplifier, and 16 designates a transmission signal output selector, and 17 designates a reception signal input selector, and 18 designates a transmission signal electric power switching section, and 19 designates an A antenna, and 20 designates a B antenna, and 21 designates a C antenna, and 22 designates a reception electric power calculator.

At the beginning, an outline of each section will be described by use of FIG. 1, and after that, modified embodiment and configuration, function of each section will be described by use of FIGS. 4 through 11, and finally, an operation of the wireless communication medium in the implementation mode 1 will be described.

Firstly, the wireless communication medium processing apparatus 1 will be described.

The wireless communication medium processing apparatus 1 is an apparatus which can carry out writing, or reading, or reading/writing of data, with a wireless communication medium 11 which can carry out non-contact communication, such as an IC tag, an IC card, an ID card, an ID tag, and is a thing which is collectively called as a so-called reader, reader/writer etc. Meanwhile, the figure represents an internal configuration, but according to need, it is stored in a housing, and stored in a building inside, a structural body which configure various systems. The wireless communication medium 11 stores various information for carrying out ID authentication which will be described later.

Next, the reading/writing section 2 will be described.

The reading/writing section 2, as they say, modulates data to be actually written in a wireless communication medium, or demodulates data received from the wireless communication medium 11, to authenticate its ID code, in the wireless communication medium processing apparatus 1. Depending on circumstances, there is also such a case that this reading/writing section 2 is called as a reader and a reader/writer. In addition, the reading/writing section 2 is configured by electronic components and integrated circuits (so-called IC and LSI), and all functions may be configured by hardware, or may be configured by software centering on CPU, and may be configured by composition of them. In addition, in the reading/writing section 2, on the occasion of carrying out recognition of an ID code from the wireless communication medium according to need, error detection and error correction may be carried out, and after ID code recognition, a display section which displays its result and notification means by use of sound etc. may be disposed.

In addition, the reading/writing section 2 may have a control section which carries out control of the entirety of the wireless communication medium processing apparatus 1, and may be equipped with instruction input means (e.g., a touch panel and a keyboard etc.) in order for a user to operate the apparatus and to give various instructions. In addition, it is also suitable to carry out overall control such as carrying out synchronization processing of the entire apparatus, or carrying out malfunction detection processing.

In addition, in the reading/writing section 2, in case of transmission, data for giving electric power to the wireless communication medium 11 is outputted through the transmission main line 9, or data to be written in the wireless communication medium 11 is modulated, and in the same manner, outputted through the transmission main line 9.

On this account, the reading/writing section 2 includes a modulation section, a demodulation section and so on.

Next, the transmission distributor 3 will be described.

The transmission distributor 3 distributes a transmission signal which was outputted from the reading/writing section, and then, outputs it to a plurality of antennas 5 which are connected ahead in a distributed manner. The output is inputted to the antenna circuit substrate 6 through the transmission line 7, and applied to the antenna 5. The transmission signal is outputted to the antenna 5, and thereby, as described later in detail, a magnetic filed is applied to the wireless communication medium 11 and electric power is applied thereto, and writing of data is carried out.

The transmission distributor 3 outputs an identical signal to the antenna 5 which is connected thereto, in a normal state. On this account, it is different from prior art, and regardless of one reading/writing section 2, it is possible to have a number of antennas operated simultaneously, and for example, in case that a number of the antennas 5 are disposed at different places, it becomes possible to carry out communication with the wireless communication medium 11 which exists in any one of these communication ranges. Alternatively, it is possible to realize a very wide communication range.

Figure 2:
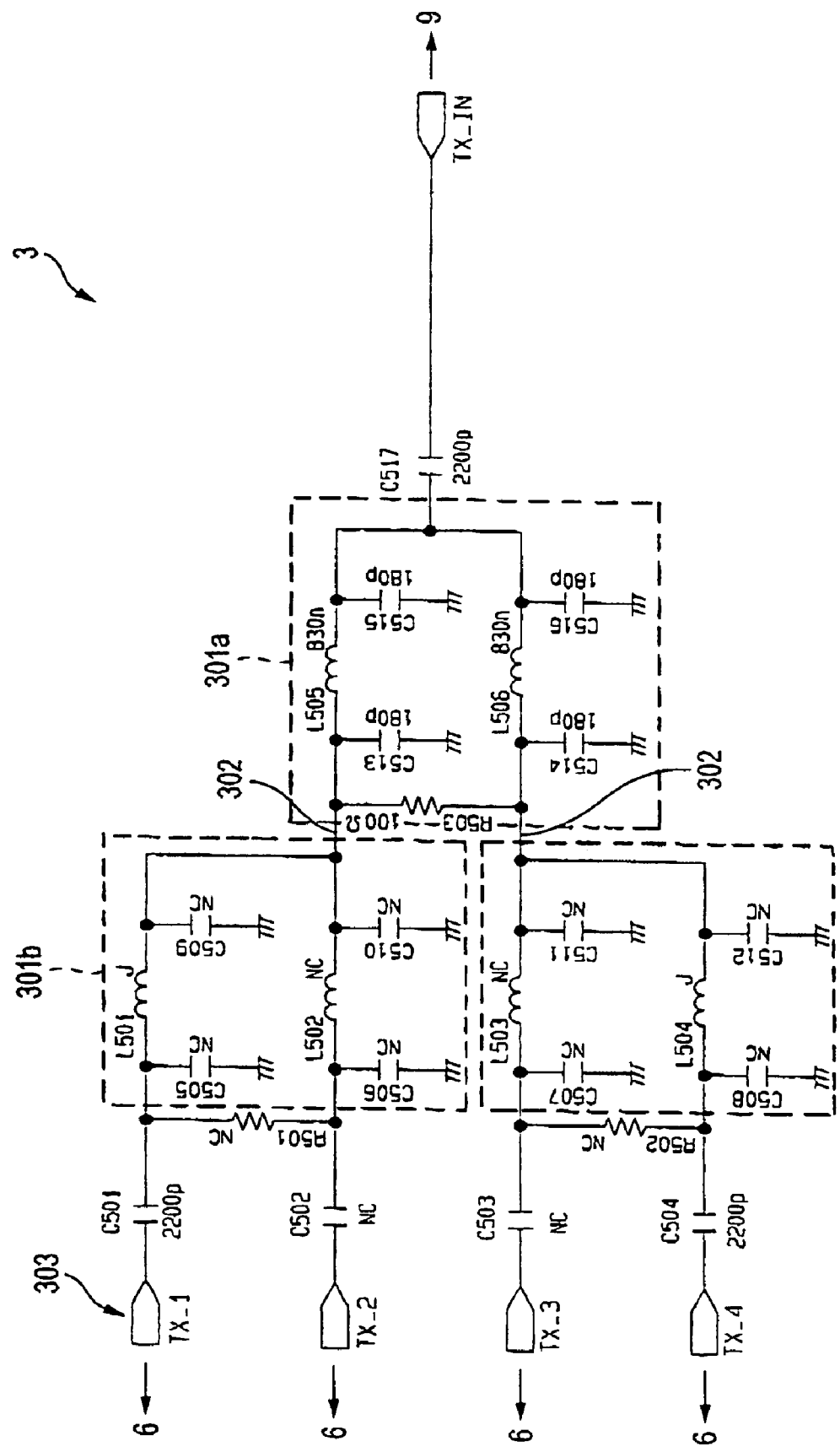
FIG. 2 is a circuit diagram which shows on e example of a transmission distributor.

FIG. 2 is a circuit diagram which shows on e example of a transmission distributor 3. In the transmission distributor 3 shown in FIG. 2, it shows such a case that a wireless communication medium processing apparatus 1 has four antennas 5 (not shown in the figure). The transmission distributor 3 is, as shown in FIG. 2, configured by a plurality of distributors (broken line frame). A reading/writing section 2 (not shown in the figure) is connected to a distributor 301a through a transmission main line 9. The distributor 301a has two output terminals 302, and each output terminal 302 is connected to two distributors 301b. The distributor 301b has two output terminals 303, respectively, in the same manner as the distributor 301a, and four output terminals 303 in total are connected to four antennas 5 through an antenna circuit substrate 6, respectively.

Next, the reception compositor 4 will be described.

The reception compositor 4 combines reception signals from the plurality of antennas 5 which are connected, and outputs it to the reading/writing section 2 through the reception main line 10. By this means, all of reception signals from the wireless communication medium 11, which were by a number of the antennas 5 is to be received by the reading/writing section 2 in a concentrated manner. The reading/writing section 2 demodulates this combined reception signal to demodulate an ID code, and can recognize that ID code.

In this way, by combining reception signal from a number of antennas by use of the reception compositor 4, it enables a number of antennas to carry out simultaneous reception, and in a number of the antennas 5 which exist at different places, even if the wireless communication medium 11 exists anywhere, it becomes possible to carry out communication at all times, and to recognize its ID code.

Meanwhile, at this time, the reception compositor 4 combines a wave detection signal which was wave detected, but not RF signal itself which was received by the antenna 5. As to the wave detection, as described later, if a reception signal is modulated with ASK and FSK etc., it is realized by use of a rectifier, a down-conversion section etc. Alternatively, if PSK, multi-value modulation, orthogonal modulation etc. are used, there is also such a case that wave detection is realized by further use of orthogonal demodulation etc.

The wave detection section 13, which generates this wave detection signal, may be installed on the antenna circuit substrate 6 which was directly coupled to the antenna 5, or may be disposed at any place between the antenna 5 and the reception compositor 4, or may be disposed in an inside of the reception compositor 4. However, when it is disposed on the antenna circuit substrate 6 which was directly coupled to the antenna 5, by this means, a wave detection signal, whose frequency was lowered (depending on circumstances, it still have continuity, but it is a base band signal which is close to a digital signal having slightly discreteness) by wave detection, but not a RF signal with high frequency, flows through the reception line 8 which is pulled around from each antenna 5 to the reception compositor 4, and therefore, there is no mutual interference.

In addition, since it becomes low frequency, it also becomes strong against noise, and it becomes difficult to receive influence of superfluous noise at the time of combining, and as compared with such a case that combining is carried out in an analog manner without modification from RF signal as in prior art, it is possible to prevent wave form fluctuation due to noise and wave form breakup at the time of combining.

In addition, since it has already become a wave detection signal, combining of signals is realized by use of a simple adder, and therefore, signal electric power loss, which is proportional to the number of antennas, does not also occur. On this account, in case of demodulation of a signal which was combined in the reception compositor 4 and outputted to the reading/writing section 2, nose and electric power loss at the time point of combining are almost avoided unlike the prior art, and therefore, accurate demodulation becomes possible, and it is possible to suppress generation of erroneous decision etc. in ID authentication very much.

On this account, there is also such a merit that a necessity of error correction, which requires a large-size circuit, and so on is eliminated, and it is possible to satisfy requirements of miniaturization and low cost of the apparatus.

In addition, there is also no necessity to have a plurality of demodulation sections as in the prior art, and low cost and miniaturization are realized.

Further, at this time, unlike a case of using a number of the reading/writing sections 2 as in the prior art, synchronization processing etc. between the reading/writing sections 2 become unnecessary, and there is also such a merit that erroneous reading etc. of an ID code are eliminated. Alternatively, it is unnecessary to arbitrarily switch the antenna 5 to be activated, by an antenna changeover switch, as in the prior art, and therefore, a communication range is wide, and as a matter of course, communication by use of all antennas 5 simultaneously is realized.

Figure 3:
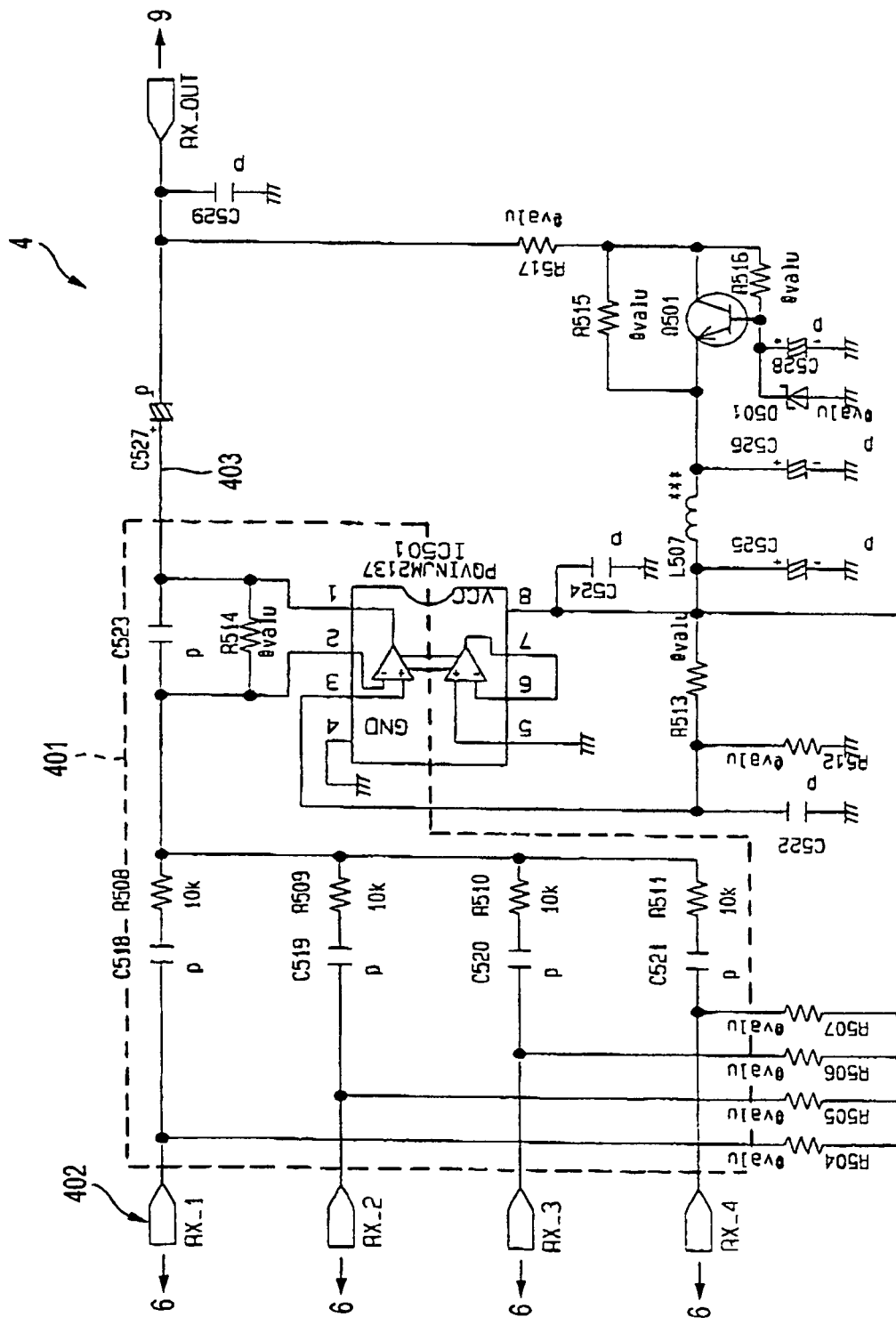
FIG. 3 is a circuit diagram which shows one example of a reception compositor.

FIG. 3 is a circuit diagram which shows one example of a reception compositor 4. In the reception compositor 4 shown in FIG. 3, it shows such a case that the wireless communication medium processing apparatus 1 has four antennas 4 (not shown in the figure), in the same manner as in FIG. 2. The reception compositor 4 has an addition circuit 401 (broken line frame). The addition circuit 401 has four input terminals 402, and one output terminal 403. Four antennas 5 are connected to four input terminals 402 through the antenna circuit substrate 6. The output terminal 403 is connected to the reading/writing section 2 (not shown in the figure) through the transmission main line 9.

Meanwhile, the transmission distributor 3 and the reception compositor 4 may be disposed at places which are different from that of the reading/writing section 2, or may be disposed at the same place, and may be stored in the same housing. In addition, the transmission distributor 3 and the reception compositor 4 may be formed by combination of electronic components, and may be formed by a dedicated LSI, and may be configured by combination of software and hardware. If it is configured by software, it becomes easy to respond to various ex post modifications, and if it is configured by hardware, low power consumption and miniaturization are facilitated.

Next, the antenna 5 will be described.

The antenna 5 becomes a relay of the wireless communication medium 11 and the reading/writing section 2 to realize communication, and applies a magnetic field to the wireless communication medium.

The antenna 5 is formed by a conductor, and the conductor may be formed by single metal, and may be an alloy, and may be various things such as a thing in which metal coating etc. were applied to ceramic and resin etc. Steel, stainless, aluminum etc. are suitable, but other materials may also be used. In addition, in order to prevent a distant magnetic filed, it is suitable to dispose an electric field leakage resistance plate etc. at the periphery of the antenna 5, and in order to concentrate a magnetic field on a certain area, it is also suitable to dispose a magnetic material plate.

Figure 1:
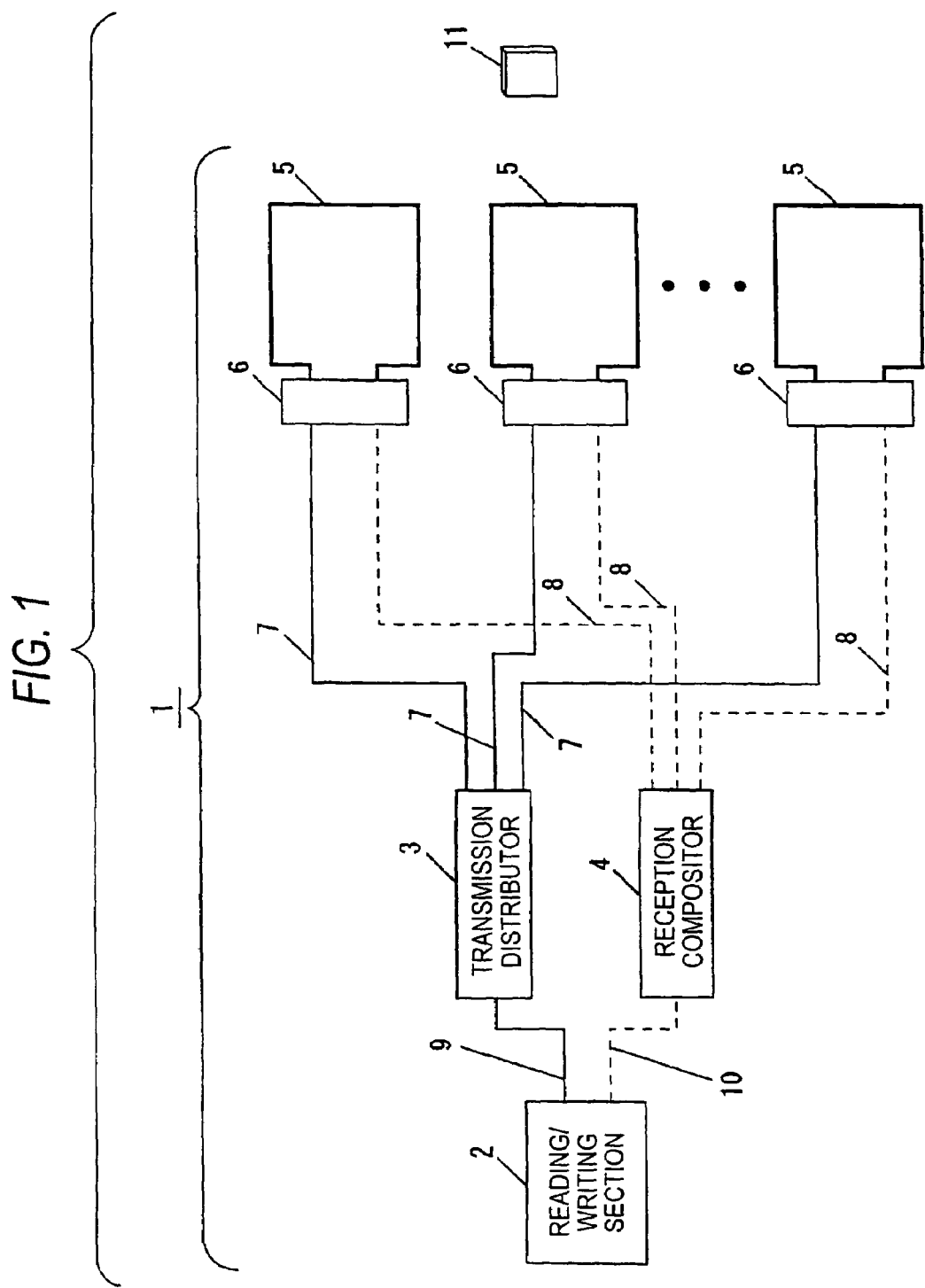
FIG. 1 is a block diagram of a wireless communication medium processing apparatus in an implementation mode 1 of the invention

In addition, the antenna 5 is represented by a loop antenna having a loop shape, in FIG. 1 etc., but it may also be a bar shaped antenna and a plate-like one, other than the loop antenna. In addition, it is also suitable to use not only a loop antenna having an opening portion of a two-dimensional shape but also a three-dimensional loop antenna which forms an opening portion in a three-dimensional space. In this case, it becomes possible to apply a magnetic field, regardless of a position and a direction of the wireless communication medium 11, and expansion of a communication range is realized.

In addition, by disposing an expansion/contraction section and a folding back section etc. at an arbitrary spot of a conductor of the antenna 5, it is possible to make a shape and a size of the antenna 5 changeable arbitrarily, and it is possible to realize the antenna 5 which can appropriately respond to a use mode and an installation place.

The suchlike antenna 5 is disposed at each of a number of gateways which exit in an office floor, and is disposed at a gateway of a shop, and so on.

Next, the antenna circuit substrate 6 will be described.

The antenna circuit substrate 6 is connected to the antenna 5, and the antenna circuit substrate 6 is connected to the transmission line 7, the reception line 8, and connected to the transmission distributor 3, the reception compositor 4 ahead.

On the antenna circuit substrate 6, mounted are a feeding section which feeds a signal current to the antenna 5, a reception section which outputs the signal current, which was received by the antenna 5, to the reception line 8, a matching circuit which carries out impedance matching, a terminating resistance, a resonance circuit which adjusts transmission/reception frequency, and so on.

Meanwhile, these may be mounted as individual electronic components, and may be mounted as an integrated circuit, and may be mounted on each of the same substrate and different substrates. In addition, it may be a non-substrate, and may be formed in such a manner that discrete electronic components are stored in a housing, and they may be stored including the antenna 5.

The wireless communication medium 11 is, as described above, a medium which carries out various non-contact wireless communications to communicate its ID code etc., such as an IC tag, an IC card, an ID tag, an ID card, a non-contact card, and normally, electric power is supplied thereto by an induced current which is generated by a magnetic field from the antenna 5, but it may also be the wireless communication medium 11 which has electric power in itself.

The foregoing is a basic configuration of the basic wireless communication medium processing apparatus 1 in the implementation mode 1, and does not require a number of reading/writing sections 2 as in the prior art, and a very low cost wireless communication medium processing apparatus is realized.

Next, by use of FIG. 4, a system for transmitting a base band signal, in order to eliminate noise which became a problem in case of transmitting a RF signal as in the prior art, in the transmission line 7 and the reception line 8, will be described.

In the up-conversion section 12, carried out is such processing that a signal, which was outputted from the reading/writing section, is up-converted to predetermined high frequency which was determined by a standard etc., in the transmission main line 9, on the occasion of transmitting a base band signal with high noise resistance characteristic from the antenna 5 to the wireless communication medium 11. For example, by use of a mixer and VCO etc., a base band signal with a level of several KHz through several hundred KHz is up-converted to frequency of MHz unit, and thereby, it becomes possible to make transmission from the antenna 5 to the wireless communication medium 11 at desired frequency. For example, it is increased to 13.56 MHz which is defined in RF-ID standard etc.

Meanwhile, at this time, it is also suitable to remove a unnecessary high frequency component by a low-pass filter (not shown in the figure).

The up-conversion section 12 is, as shown in FIG. 7, mounted on the reading/writing section 2 and the transmission distributor 3 etc., in advance, and by this means, a transmission signal is frequency-converted to transmission frequency. Meanwhile, up-conversion may be carried out by another method, without using the up-conversion section 12.

Meanwhile, in IDOISO15693 which is one of RF-ID standards, it is defined that communication is carried out at 13.56 MHz.

Next, the wave detection section 13 will be described.

The wave detection section 13 uses a rectifier and the down-conversion section 13a.

The wave detection section 13 carries out wave detection of a reception signal which was received from the wireless communication medium 11 at the antenna 5.

In case that a reception signal is modulated by ASK and FSK, it is possible to obtain a wave form having a pretty much smooth curve, by use of a rectifier. At this time, if a modulation system is ASK, a portion which represents "1"of data is rectified to a terraced mountain shaped wave form, and therefore, in the reading/writing section 2, it becomes possible to finally demodulate digital data by envelope demodulation etc., and it is possible to take out digital data.

In case of FSK, by changing a frequency band which can be rectified, a wave form after rectification is sorted into a high frequency portion and a low frequency portion, and this is separated by clock sampling and a filter etc., and "1", "0" of data is separated, and digital data can be demodulated.

In addition, it is once lowered to low frequency by use of the down-conversion section 13a, and then, processing is carried out, which is also suitable. In this case, noise is getting fewer, and in addition to that, processing by use of a low cost circuit becomes possible. At this time, clock sampling etc. are effectively used to carry out demodulation.

As the down-conversion section 13a, a mixer and VCO etc. are used, and a multiplier etc., which become necessary, may be shared with the up-conversion section 12 and the down-conversion section 13a.

A reception signal, which was received by the antenna 5, is a signal having high frequency of for example, 13.56 MHz which is determined in the RF-ID standard etc., and generation of noise due to such a fact that a signal, which transfers through the reception line 8 connected up to the reception compositor 4, and the reception main line 10 connected to the reading/writing section 2, is of high frequency, becomes a problem.

At this time, in the down-conversion section 13, frequency is reduced to a base band signal of low frequency such as several KHz through several hundred KHz etc., and thereby, a noise resistance characteristic is heightened, and the above-described problem is solved.

In particular, in case that a number of the antennas 5 are connected to and concentrated on one reading/writing section 2, and in addition, a transmission side, which is uplink, and a reception side, which is downlink, are entwined intricately, the problem of noise becomes severe in high frequency, but by dropping a signal to a low frequency base band signal and transferring it through the use of the up-conversion section 12 and the down-conversion section 13a in this way, it is possible to solve these noise problems. By this means, it became possible to avoid such a necessity that, in order to avoid this in the past, a number of reading/writing sections are disposed and thereby, cost is increased, or an antenna changeover switch, which sacrifices a simultaneous operation, is introduced.

Figure 4:
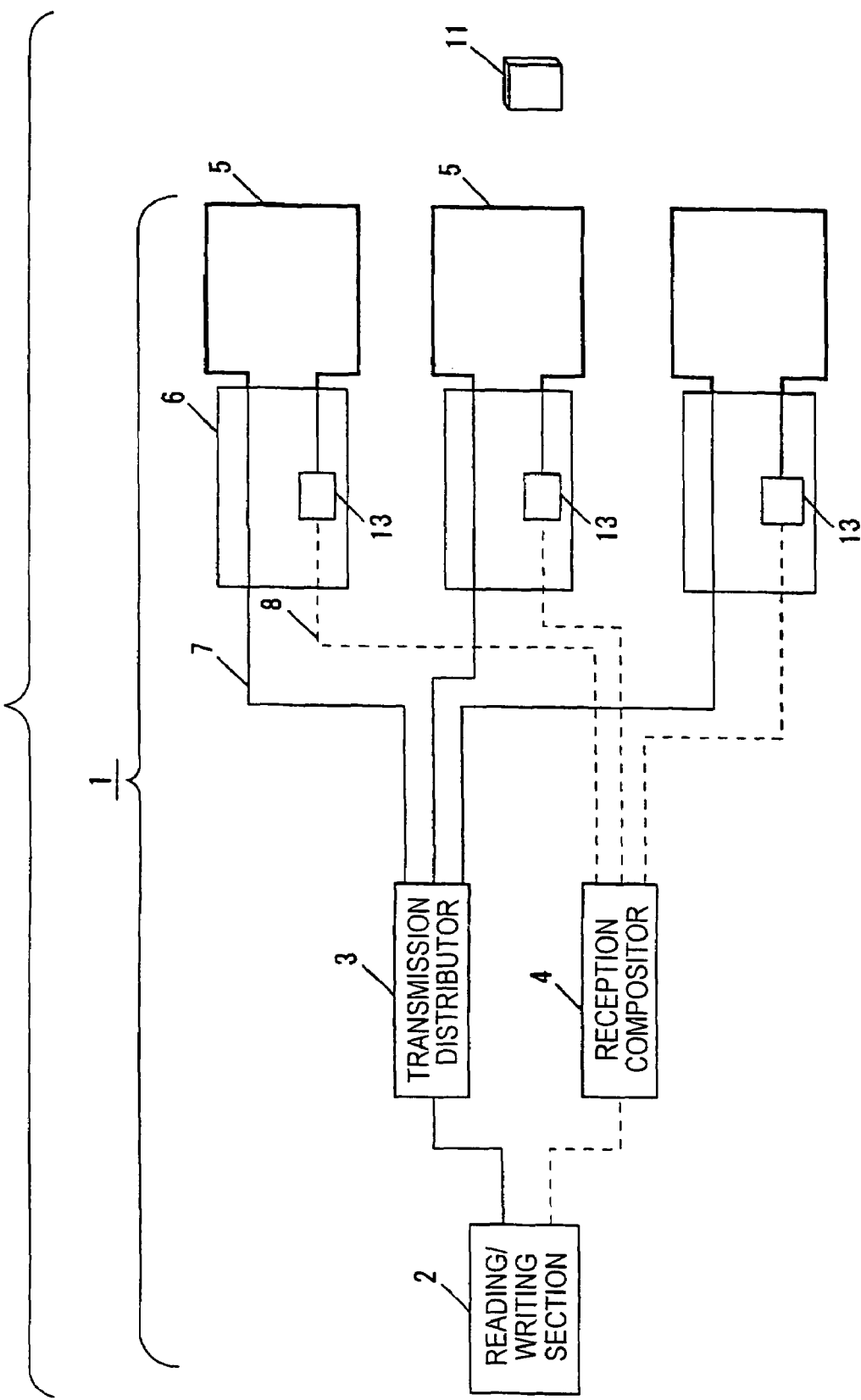
FIG. 4 is a block diagram of the wireless communication medium processing apparatus in the implementation mode 1 of the invention

Meanwhile, in FIG. 4, the wave detection section 13 is mounted on the antenna circuit substrate 6, but, for example, it may also be mounted on the transmission distributor 3 and the reception compositor 4, and may also be mounted on a separate housing and substrate, and all together with the transmission distributor 3 and the reception compositor 4, the reading/writing section 2, etc. may be stored in, mounted on one housing and substrate, and it may be arbitrarily determined depending on a use mode and an installation place.

As above, it is possible to prevent noise generation and wraparound of noise, which become a problem on the occasion of having a number of the antennas 5 operated simultaneously, on one reading/writing section 2 as a base point, by use of the transmission distributor 3 and the reception compositor 4, and further, it is possible to prevent erroneous reading and unread which arise from noise.

Next, by use of FIG. 5, a case of using an amplifier in order to improve reading accuracy of a reception signal will be described.

The transmission signal amplifier 14 is mounted in a transfer path of a transmission signal, and is a thing which amplifies electric power of the transmission signal.

In addition, the reception signal amplifier is mounted in a transfer path of a reception signal, and is a thing which amplifies electric power of the reception signal.

As the transmission signal amplifier 14, a power amplifier is suitably used, and as the reception signal amplifier 15, a low noise amplifier is suitably used.

In addition, it is desirable that a transmission amplifier is mounted after frequency increase in the upconversion section 12, from the point of noise exclusion etc., but depending on circumstances, it may be disposed on the transmission distributor 3 and the reading/writing section 2. In addition, it is also all right if the transmission signal amplifier 12 is mounted one by one with respect to each antenna 5, but from the viewpoint of cost, it is also suitable to reduce the number of the transmission signal amplifier 12, by disposing it at a front stage of distributing a signal with respect to each antenna in the transmission distributor 3 and the reading/writing section 2 etc.

Figure 5:
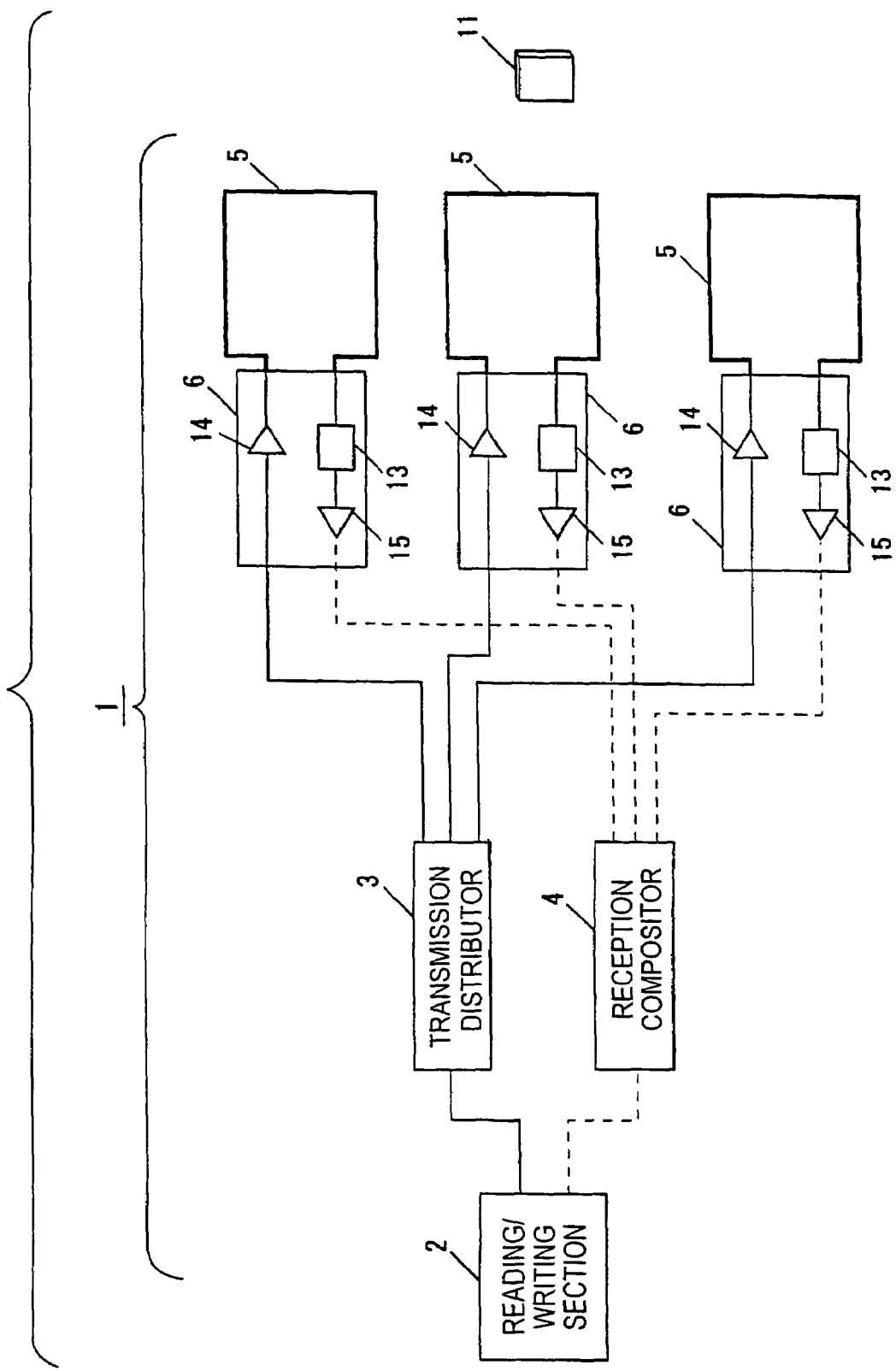
FIG. 5 is a block diagram of the wireless communication medium processing apparatus in the implementation mode 1 of the invention
Figure 8:
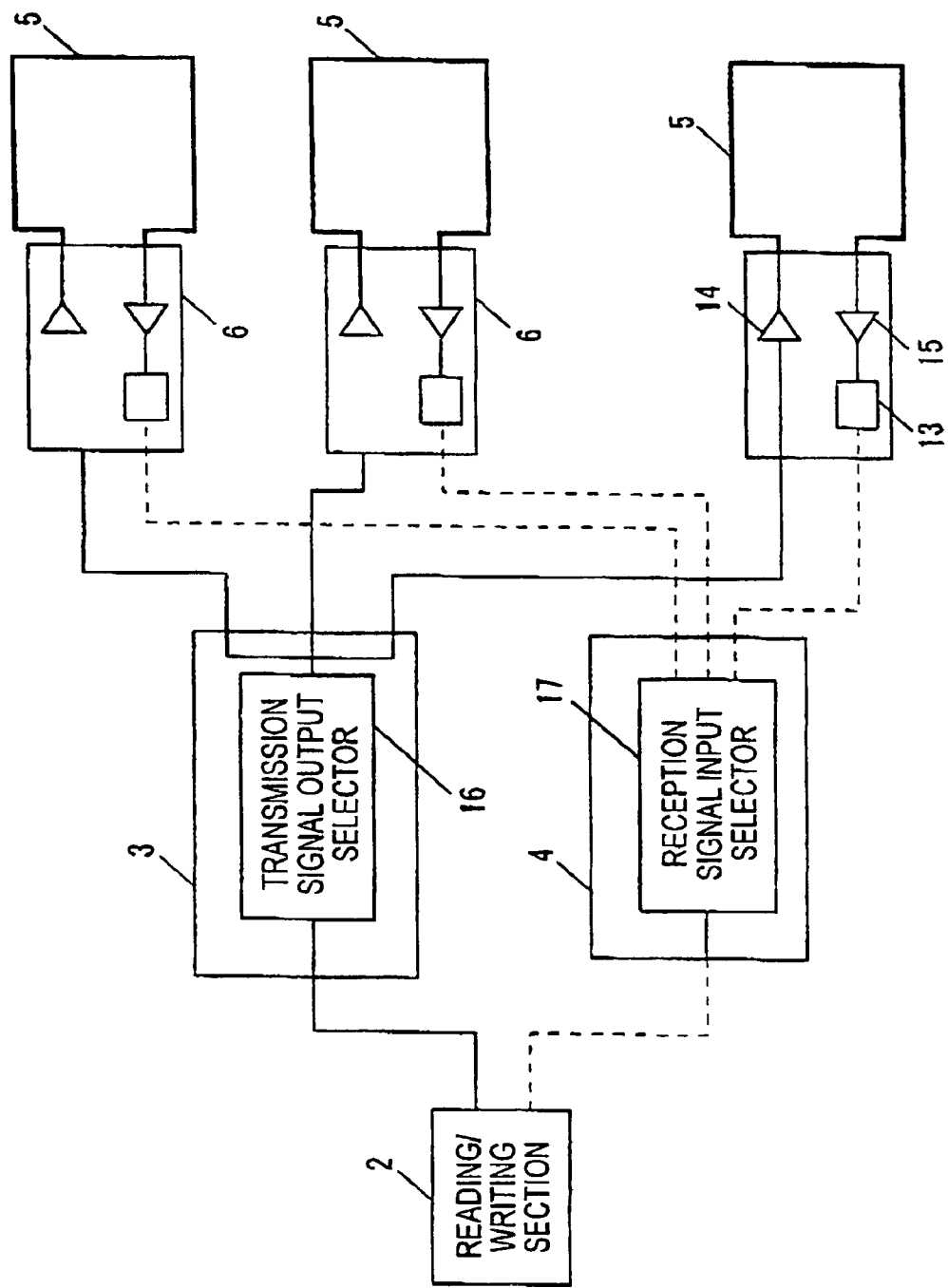
FIG. 8 is a block diagram of the wireless communication medium processing apparatus in the implementation mode 1 of the invention

In the same manner, a reception amplifier may be disposed after an output of the wave detection section 13 as shown in FIG. 5, and may be disposed before the wave detection section 13 as shown in FIG. 8. In addition, it may be also disposed after reception signals were combined in the reception compositor 4 and the reading/writing section 2. In addition, these may be discrete devices, and may be integrated as an integrated circuit, together with another wave detection section 13 and another impedance matching circuit etc., and in this case, miniaturization and low power consumption etc. are realized.

Figure 6:
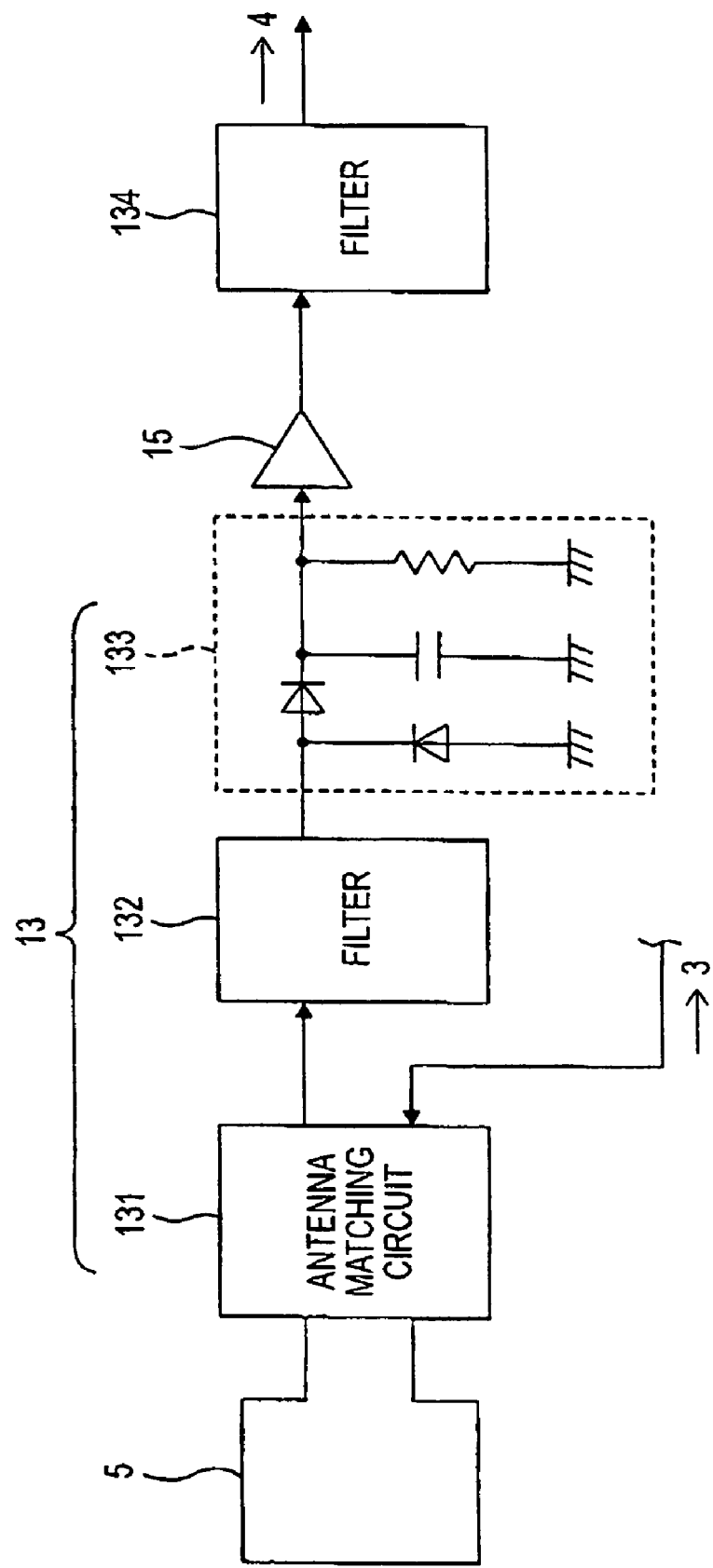
FIG. 6 is a circuit diagram which shows one example of a wave detector periphery

FIG. 6 is a circuit diagram which shows one example of a wave detector 13 periphery. The wave detector 13 has, as shown in FIG. 6, an antenna matching circuit 131, a filter 132, and a wave detection circuit 133. The antenna is connected to the reception compositor 4 (not shown in the figure) through a wave detection section 13, a reception signal amplifier 16, and a filter 134. In addition, the antenna matching circuit 131 is connected to the transmission distributor 3 (not shown in the figure). In the wave detection section 13, as shown in a broken line frame, a diode is serially connected to a line of input/output, and further, a diode, a resistor, and a capacitor are connected to this line in parallel.

FIG. 4 shows such a case that, in the transmission distributor 3, the upconversion section 12 and the transmission signal amplifier 14 are disposed before a transmission signal is distributed, and such a case that, in the reception compositor 4, the downconversion section 13a and the reception signal amplifier 15 are disposed after reception signals from the plurality of antennas were combined. As a matter of course, as described above, it may be disposed and mounted in an inside of the reading/writing section 2.

Meanwhile, these may be stored in an apparatus which was stored in one housing, and may be separately stored in separated housings and disposed flexibly.

The foregoing explains a case of having a number of the antennas 5, which are connected from the reading/writing section 2, operated simultaneously, and distributing a transmission signal to all antennas which are connected in order to realize simultaneous communication with the wireless communication medium 11 which exists in a communication range of any one of these antennas 5, or simultaneous communication with a plurality of wireless communication media 11, to combine reception signals.

Next, by use of FIGS. 8 through 11, to arbitrarily select any part of the plurality of antennas 5 depending on a use mode and have it operated will be described.

FIG. 8 shows such a state that, in an inside of the transmission distributor 3, the transmission signal output selector 16, which selects any arbitrary one (singular number, or plural number) of the plurality of antennas 5 and outputs a transmission signal, is mounted, and in the same manner, in the reception compositor 4, the reception signal input selector 17, which selects any arbitrary one (singular number, or plural number) of reception signals from the plurality of antennas 5 and outputs the reception signal, is mounted.

The transmission signal output selector 16 carries out an operation for switching to any antenna among the plurality of antennas 5 a transmission signal, which was outputted from the reading/writing section 2, is outputted. For example, it is realized by use of a switch, an attenuator etc. For example, it is useful to such a case that an operation of the antenna 5, which is disposed at a unnecessary place, is stopped in a certain time zone and a certain state, to reduce electric power consumption, in case that a number of the antennas 5 are disposed. Alternatively, it is appropriate to such a case that, in order to fully block off entering and leaving at a specific gateway, the antenna 5, which was disposed there, is stopped to fully block off (i.e., fully block off entering and leaving) authentication of the wireless communication medium 11, in such a case that the wireless communication medium processing apparatus 1 shown in FIG. 8 is used for security of entering and leaving management of an office floor.

In this way, by the transmission signal output selector 16, the antenna 5, which outputs a transmission signal, is arbitrarily selected, and thereby, only an antenna to be required is made active, and it becomes possible to carry out communication with a wireless communication medium, only in a communication range of the specific antenna 5.

On one hand, also in the reception signal input selector, in the same manner, only a reception signal from any arbitrary antenna 5 among reception signals received by the plurality of antennas 5 is selected, and combined, and outputted to the reading/writing section 2.

For example, this is also in the same manner, and as to a reception signal from the antenna 5 which is disposed at an arbitrary place, recognition of this is blocked off, and the wireless communication medium 11, which is in a communication range of the antenna 5 which is not selected as one outside an object to be combined of reception signals, is set to be outside an object for ID authentication, and thereby, there is such merits that security is improved and it is possible to configure a user-friendly apparatus.

Figure 9:
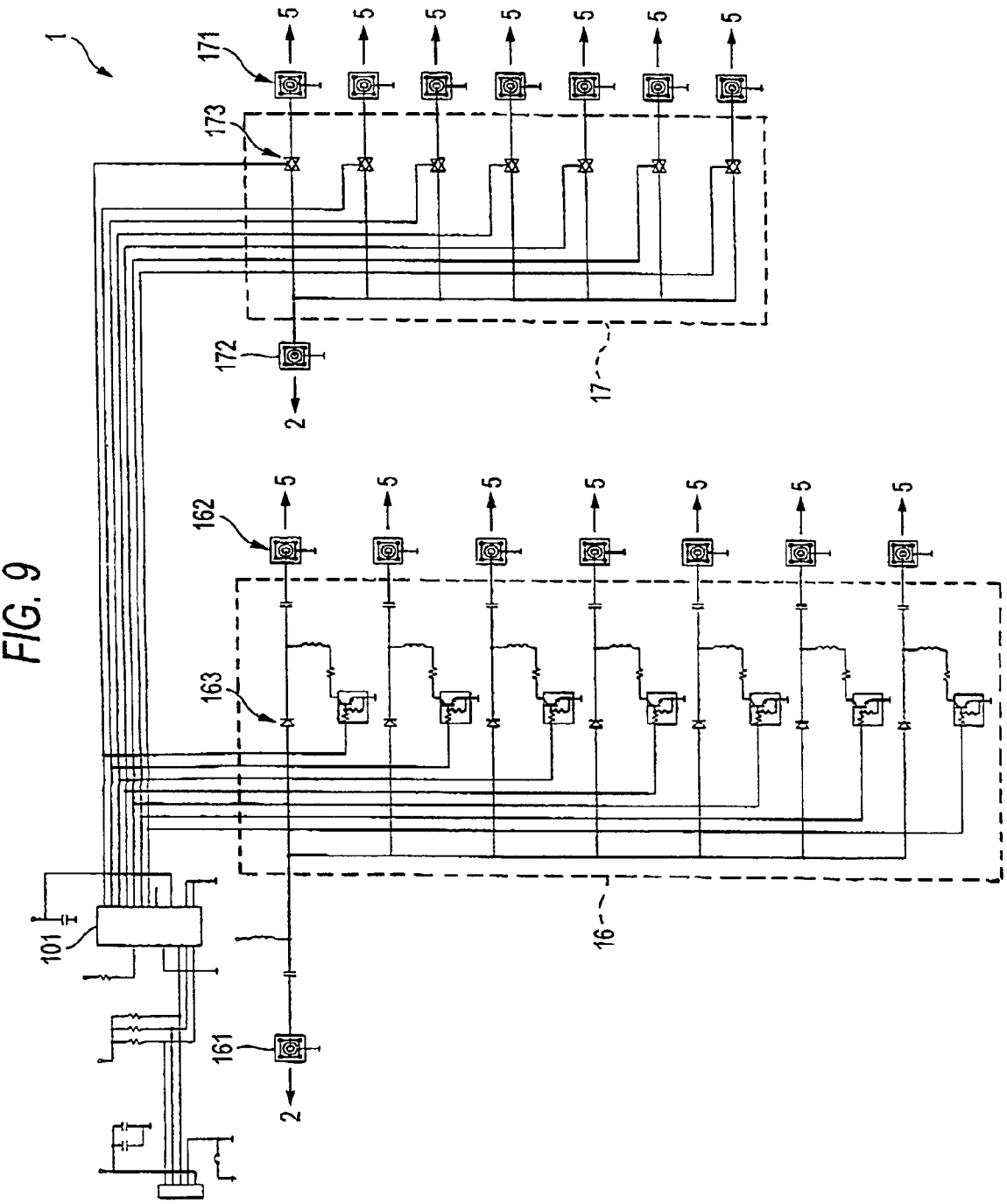
FIG. 9 is a circuit diagram which shows one example of the wireless communication medium processing apparatus.

FIG. 9 is a circuit diagram which shows one example of the wireless communication medium processing apparatus 1 which includes a transmission signal output selector 16 and a reception signal input selector 17. In the wireless communication medium processing apparatus 1 shown in FIG. 9, it shows such a case that it has seven antennas 5 (not shown in the figure). In addition, the wireless communication medium processing apparatus has, as shown in FIG. 9, the transmission signal output selector, the reception signal input selector 17, and a multiplexer 101.

The transmission signal output selector 16 has one input terminal 161, and seven output terminals 162. Between the input terminal 161 and each output terminal 162, a PIN diode switch (Positive Intrinsic Negative diode switch) 163 is disposed. ON/OFF of each PIN diode switch 163 is controlled by a control signal which the multiplexer 101 outputs. On one hand, the reception signal input selector 17 has seven input terminals 171, and one output terminal 172. Between each input terminal 171 and the output terminal 172, an analog switch 172, which is configured by a CMOS switch (Complementary Metal-Oxide Semiconductor switch), is disposed. ON/OFF of each analog switch 173 is controlled by a control signal which the multiplexer 101 outputs, in the same manner as the PIN diode switch 163.

In addition, in the wireless communication medium processing apparatus 1 shown in FIG. 9, as shown in FIG. 8, it shows such a case that the wave detection section 13 is disposed on the antenna 5. Therefore, a transmission signal, which is transferred in the transmission signal output selector 16, is a RF signal of 13.56 MHz. On one hand, a reception signal, which the antenna 5 received, is inputted to the reception signal input selector 17 through the wave detection section 13, and therefore, it is a wave detection signal which is of lower frequency (e.g., 400 kHz) than the RF signal.

That is, in the transmission signal output selector 16, high frequency RF signal is ON/OFF controlled, and therefore, a switch having a frequency characteristic which can be responsive to high frequency is desirable, and for example, it is possible to utilize various kinds of RF switches, in addition to the above-described PIN diode switch. On one hand, in the reception signal input selector 17, a wave detection signal, which is of lower frequency than the RF signal, is ON/OFF controlled, and therefore, there is necessarily no need to use a PIN diode switch and a RF switch as described above, and it is possible to adopt any analog switch such as a CMOS switch. By doing this, it is possible to reduce a manufacturing cost of the wireless communication medium processing apparatus 1 with simplifying a switch which is used, over properly carrying out ON/OFF control.

Next, FIG. 6 shows such a case that, according to a difference of a shape etc. of the antenna 5, electric power of a transmission signal, which is given from the reading/writing section 2 to the antenna 5, is arbitrarily changed.

For example, as shown in FIG. 10, the A antenna 19, the B antenna 20, the C antenna 21 are such antennas that its loop shape and a size of an opening portion are different, respectively.

These are different depending on, for example, a difference of a size and a shape of an installation place, or a difference of a desired communication range at an installation place, and so on. For example, there is such a case that, at a plurality of gateways which exist on an office floor or a shop, the A antenna 19 is disposed on a middle-size door, and the B antenna 20 is disposed on a window, and the C antenna 21 is disposed on a main gate.

In this way, in case that a shape of an antenna is different, a communication range is also different, and therefore, electric power, which is required for a transmission signal to be applied (as a result, applied to the wireless communication medium 11), is different. On this account, in this way, in accordance with a shape, a size, a position, a location, a desired communication range of an antenna, electric power switching is carried out in the transmission signal electric power controller 18. For example, it is realized by switching electric power through the use of different signal amplifiers.

By this means, it becomes possible to realize such a state that a transmission signal, which has an appropriate electric power amount, is applied to each antenna, according to need, and an appropriate communication range is secured, and improvement of assuredness of communication with the wireless communication medium 11 is realized.

Meanwhile, at this time, a shape and a size of an antenna are stored as a database in an information table which was programmed in advance, and it is suitable to switch output signal electric power in the transmission signal electric power controller 18 in accordance with a program. In this case, by changing only the program at later time, it becomes possible to easily respond to a change, and a highly user-friendly wireless communication medium processing apparatus is realized.

Meanwhile, as a matter of course, antenna information is arbitrarily inputted to the antenna circuit substrate 6 etc., and this is fed back to the transmission signal electric power controller, and thereby, it becomes possible to realize appropriate electric power switching.

Next, as shown in FIG. 11, to realize more particular selection control by calculating reception electric power of a reception signal with respect to each of the plurality of antenna will be described.

The reception electric power calculator 22 calculates reception electric power at each of the A antenna 19, the B antenna 20, and the C antenna 21. Calculation of reception electric power is carried out by integrating an electric power amplitude amount per unit time, and reception electric power of a reception signal at each antenna is calculated. At this time, for example, in case that the A antenna 19, the B antenna 20, and the C antenna 21 were disposed at random, respectively, there is such a case that the wireless communication medium 11 exists in the vicinity of any one of the antennas. At this time, in case that the wireless communication medium 11 exists only in a communication range where the B antenna 20 is disposed (e.g., the wireless communication medium 11 passes through only a gateway where the B antenna 20 is disposed, and so on), only reception electric power at the B antenna 20 is large at all times, and others are small, or zero. In case that realized is such a state that the suchlike empirical rule is applicable, it is most effective that a reception signal from only the B antenna 20 is selected and demodulated by the reading/writing section 2, and also in transmission, it is suitable to select only the B antenna 20 by the transmission signal output selector 16 and to activate it, from the phase of electric power consumption saving etc.

Alternatively, in case that it is judged that reception electric power of only the B antenna 20 is large, there is such a possibility that, in the A antenna 19 and the C antenna 21, a distance with the wireless communication medium 11 is too large and communication becomes difficult. In the suchlike case, in the transmission signal electric power controller 18, it is also suitable to increase transmission electric power to the A antenna 19 and the C antenna 21, to increase communication accuracy with the wireless communication medium 11. Much the same is true on demodulation of a reception signal.

In this way, by disposing the reception electric power calculator 22 which calculates reception electric power of reception signals from a plurality of antennas, there is such a merit that low electric power consumption and security strengthening due to appropriate limitation of a communication range, appropriate response to a use mode of a user, or appropriate improvement of communication capability etc. are realized, and a more user-friendly wireless communication medium processing apparatus is realized.

Next, an operation of the wireless communication medium processing apparatus 1 will be described.

A necessary transmission signal is supplied from the reading/writing section 2 to the transmission distributor 3. The supplied transmission signal is distributed, and outputted to each antenna 5 which is connected. From a conductor of the antenna 5, a magnetic field is generated by this transmission signal. At this time, in accordance with a shape of the antenna 5, a magnetic field is generated in each vector direction.

Here, in case that the wireless communication medium 11 such as an IC tag and an IC card exists at the periphery of the antenna 5, responding to the magnetic field which is generated from this conductor, an induced electromotive force is generated on an internal antenna which is incorporated in the wireless communication medium 11. By this means, electric power and signal data are supplied to IC which is incorporated in the wireless communication medium 11. In the wireless communication medium 11 etc. to which electric power was supplied, in accordance with data from a memory installed, load fluctuation occurs in a modulation circuit which is composed of a switch and a load circuit, and this load fluctuation is transferred to the antenna by mutual inductance. The antenna 5 receives this load fluctuation as a signal, and it is transferred to the reception compositor 4 as a reception signal. The reception compositor 4 combines reception signals at these plural or single antenna 5 (at this time, as the case may be, it becomes a base band signal by rectification and down-conversion) and outputs it to the reading/writing section 2. At this time, in case of the wireless communication medium 11 which has the same ID code, even if there exist a plurality of these wireless communication media 11, a combined wave formed thereof is not broken up. In addition, if there is a single wireless communication medium 11, signals, which were received by arbitrary antennas 5 among the plurality of antennas, is combined and transferred to the reading/writing section 2. In the reading/writing section 2, this signal is demodulated, and according to need, error detection is also carried out and thereby, the signal is analyzed, and so-called digital data of "1", "0" is extracted. A train of this "1", "0" data represents an ID code, and as a result of this analysis, it becomes possible to authenticate an ID code etc. which a wireless communication medium has.

As a matter of course, it is also possible to obtain various information other than the ID code (e.g., information etc. of name, affiliation, organization etc.).

Furthermore, since it is possible to have a number of antennas operated simultaneously, it achieves an advantage for, for example, simultaneous parallel entering and leaving management at each of a number of gateways which exit on an office floor, shoplifting at a shop and so on, and in addition, since one reading/writing section is normally sufficient, it is of very low cost, and at the same time, management is possible, and it is also possible to block off an arbitrary gateway by arbitrarily closing a unnecessary antenna.

Meanwhile, as a matter of course, it is not limited to such a case that there is a single reading/writing section 2, but it is also all right even if there are a plurality of them, and there are several hierarchy structures.

By the wireless communication medium processing apparatus 1 with the configuration as described above, it is possible to realize a wireless communication medium processing apparatus in which a number of antennas are disposed at a wide variety of places at low cost, without requiring a number of reading/writing sections of high cost, unlike the prior art, and further, it is possible to prevent erroneous reading and erroneous recognition etc. due to insufficiency of synchronization processing between the reading/writing sections.

Further, unlike the prior art using the antenna changeover switch which switches an antenna to be activated, it is possible to have all antennas operated simultaneously, and it becomes possible to carry out secure communication with the wireless communication medium 11 which exits at random in communication ranges of antennas which were disposed at various places. In particular, in case that a number of antennas were disposed in a wide area, even if a wireless communication medium moves at random, it is possible to make all of these available for communication, and there is such a merit that eliminated is reliability to such casualness that it exists in a communication range of an antenna which is active. In particular, waiting for time is eliminated, and there is also no necessity to search a place where the wireless communication medium 11 exists. In addition, eliminated is the problem of noise etc. due to switch changeover, and accurate communication becomes sufficiently possible.

Further, using reception electric power etc. as the basis, by selecting an antenna to be activated, and by selecting electric power of a transmission signal, it becomes possible to realize a user-friendly wireless communication medium processing apparatus which responded to a use mode.

Meanwhile, a direct current component is overlapped in advance with any one of signals etc. of the transmission line, the reception line and it is transferred, and thereby, it is possible to supply a power source without pulling around superfluous power source and power supply circuit, power supply line to each antenna and the antenna circuit substrate, the transmission distributor, the reception compositor, which is also a desirable merit.

As above, the invention could realize simultaneous parallel communication with a wireless communication medium, and demodulation processing etc., by eliminating high cost and bad usability which arise from disposing a plurality of reading/writing sections, or switching antennas one by one, as in the prior art, and by connecting a number of antennas to one reading/writing section.

Further, focusing attention on a point of erroneous demodulation which arises from noise in mutual interference, or noise at the time of combining, or electric power loss at the time of combining, which are problems generated by combining signals from the antennas 5 directly in the reception compositor 4 through the use of RF signals, as in the prior art, the invention an epoch-making thing in which these problems are solved by inputting a once detected signal to the reception compositor 4, and even in case that a number of antennas were connected, accurate demodulation can be carried out. In particular, in case that the wave detection section 13 was disposed on the antenna circuit substrate 6 which is directly coupled to the antenna 5, there are no noise and interference even between the reception lines 8 which are pulled around, and even in case of applying this apparatus in a very wide area such as an office floor, it is possible to secure an operation with no problem.

Further, in addition to these, a direct current electric potential is overlapped in advance with a signal and it is outputted to the transmission line and the reception line etc., and thereby, it is possible to eliminate such a necessity that an extra power supply line is pulled around to each antenna 5 and the antenna circuit substrate 6 etc., and to exclude pulling-around of a power supply line, which is a very big cause of noise, and thereby, in combination with the above-described one, it is possible to realize accurate demodulation by preventing influence of noise etc., in case of applying this apparatus to a wide place etc., and it is possible to process wireless communication media simultaneously in parallel by connecting one reading/writing section and a plurality of antennas, and to realize a high reliability wireless communication medium processing apparatus.

Meanwhile, by forming a processing section for modulation, demodulation, ID authentication, control of these, or display of a result and acceptance of an instruction a reading/writing section which had a user interface, and an antenna which had a wave detection section (various shapes etc. may be used), an intermediate device by which reception combining and transmission distribution are possible (may be configured by one substrate and device, and may be configured separately) in an independent state, respectively and providing them, a user can combine them freely and build up various systems, which is desirable.

(Implementation Mode 2)

An implementation mode 2 will describe a case of carrying out communication with a plurality of wireless communication media, in particular, a plurality of wireless communication media having ID codes to be authenticated as the same kind, or a plurality of wireless communication media having ID codes to be authenticated as a different kind.

The ID code to be authenticated as the same kind, and the ID code to be authenticated as a different kind are as described at the beginning.

Figure 12:
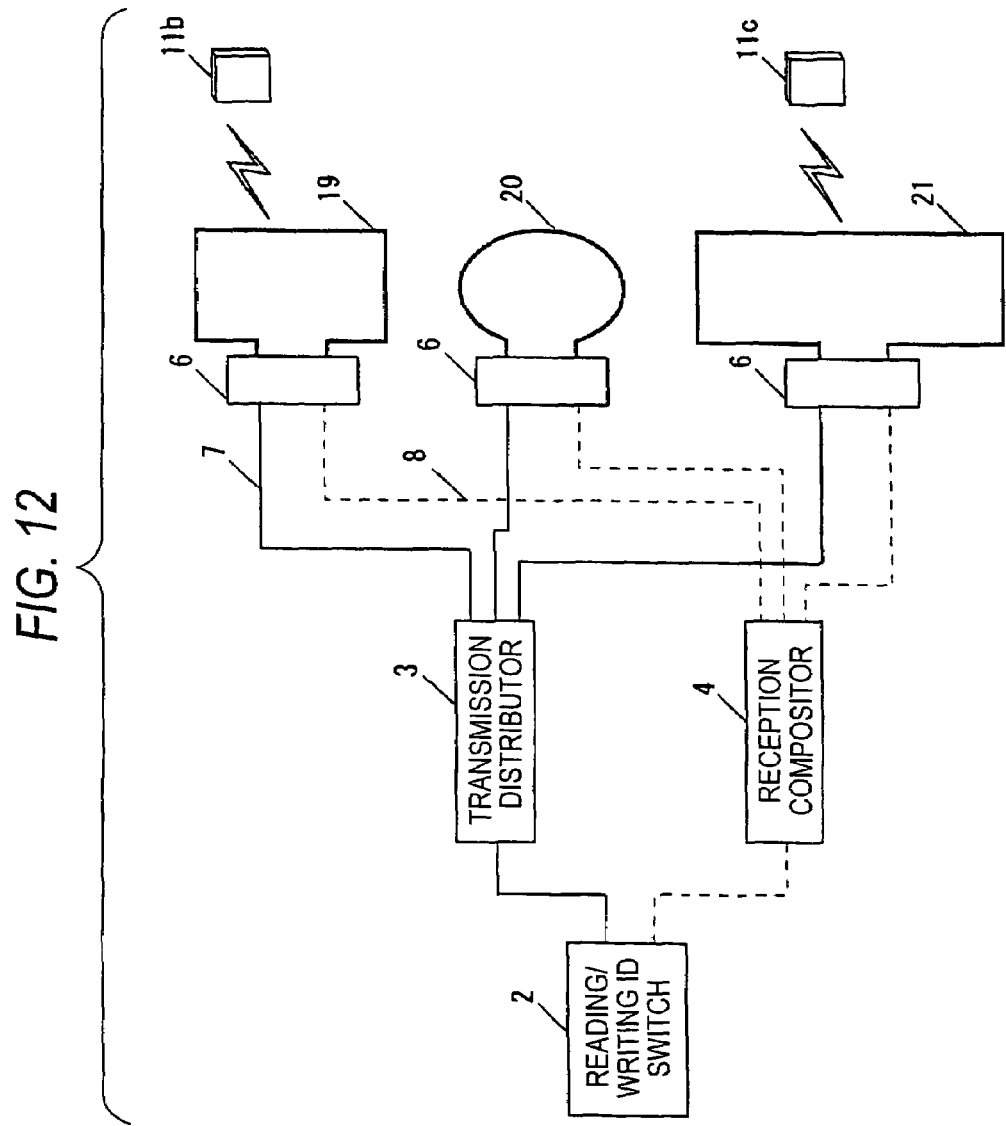
FIG. 12 is a block diagram of a wireless communication medium processing apparatus in an implementation mode 2 of the invention
Figure 13:
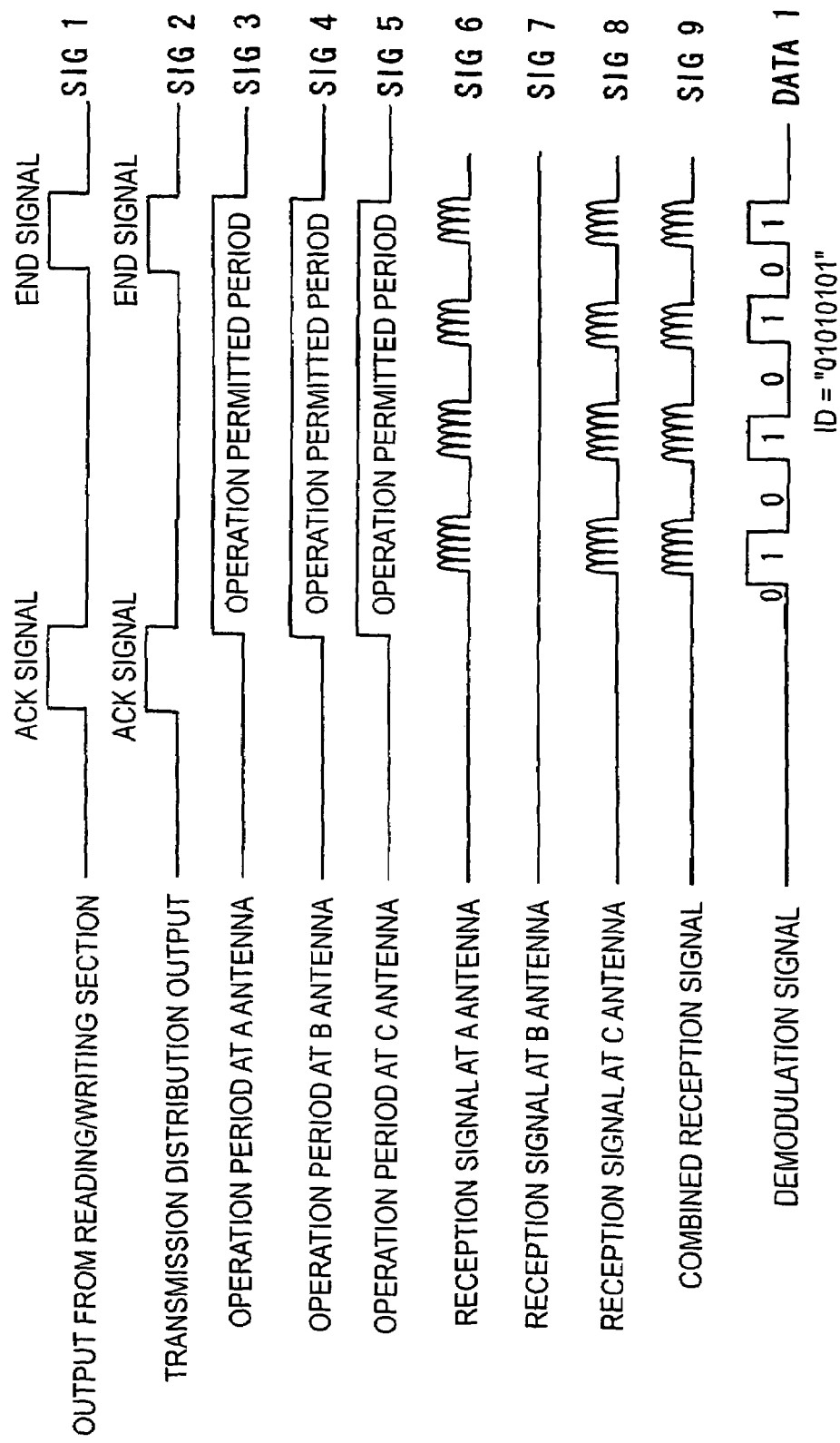
FIG. 13 is an operational timing chart in case of FIG. 12
Figure 14:
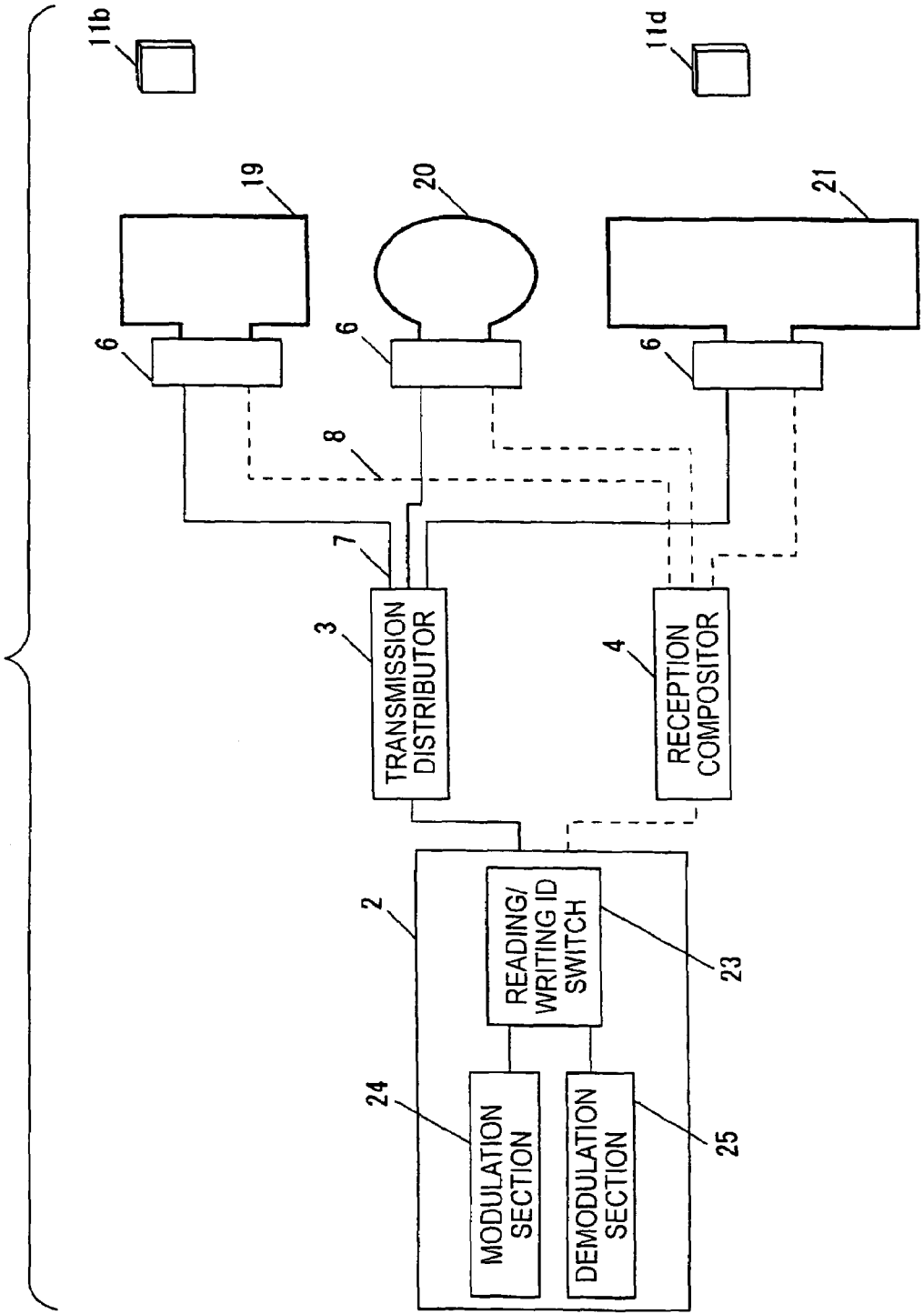
FIG. 14 is a block diagram of the wireless communication medium processing apparatus in the implementation mode 2 of the invention
Figure 16:
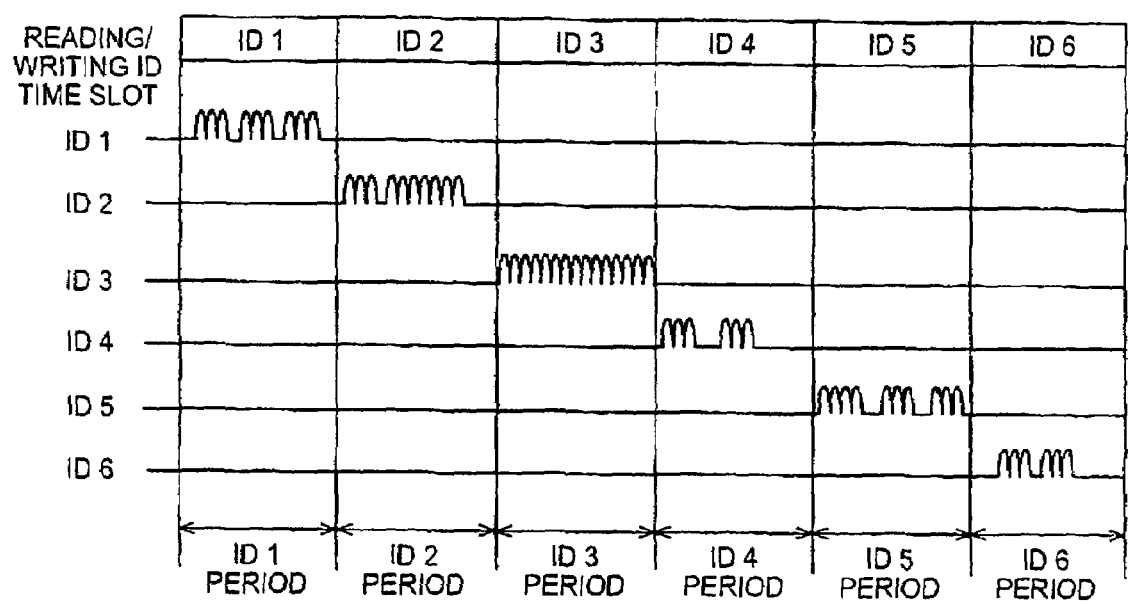
FIG. 16 is an operational time slot diagram of the wireless communication medium processing apparatus in the implementation mode 2 of the invention

FIGS. 12, 14 are block diagrams of a wireless communication medium processing apparatus in the implementation mode 2 of the invention, and FIG. 13 is an operational timing chart in case of FIG. 12, and FIG. 16 is an operational timing chart in case of FIG. 14, and FIG. 16 is an operational time slot chart of wireless communication medium processing in the implementation mode 2 of the invention.

11b, 11c, 11d designate wireless communication media, and 11b and 11c designate wireless communication media having ID codes of the same kind, and 11d designates a wireless communication medium having a different ID code.

23 designates a reading/writing ID switch, and 24 designates a modulation section, and 25 designates a demodulation section.

The modulation section 24 modulates data to be written in the wireless communication medium 11b etc. through the antenna 5, as described in the implementation mode 1, and the demodulation section 25 demodulates a reception signal as described in the implementation mode 1, to realize extraction of digital data which is composed of "1", "0".

The reading/writing ID switch 23 is a switching section for switching a period of carrying out communication with the wireless communication medium 11 having a certain ID code, and a period of carrying out communication with the wireless communication medium 11 having an ID code which is different from this and having it operated, in case that there exists the wireless communication media 11 having different ID codes, in communication ranges of a plurality of antennas 5 which are connected to one wireless communication medium processing apparatus 1.

By this reading/writing ID switch 23, even in case that there exists wireless communication media having a plurality of different ID codes, in a communication range of one wireless communication medium processing apparatus 1, it is possible to carry out accurate reading in response to this. If this switching section does not exist, different ID codes, i.e., signal patterns from wireless communication media are combined by the reception compositor 4, and it becomes impossible to carry out accurate demodulation of digital data, and erroneous reading and erroneous recognition occur. In contrast to this, by the reading/writing ID switch 23, it is possible to carry out processing with respect to each ID code in a distributed manner, and therefore, it becomes possible to carry out accurate demodulation of digital data.

That is, in case of the wireless communication medium processing apparatus 1 which is premised on such a matter that there exist only the wireless communication media 11 having ID codes of the same kind, it is all right if the reading/writing ID code switching section 23 does not carry out switching and is set to be constant, and in case of the wireless communication media 11 having different ID codes, for example, an ID code which is divided into time slots with respect to each given length of time and is read and written is repeated within a reading/writing execution period, and thereby, accurate demodulation of digital data of wireless communication media having a plurality of different ID codes is realized.

Firstly, by use of FIGS. 12 and 13, such a case that there exist a plurality of the wireless communication media 11*b*, 11*c* having ID codes of the same kind will be described.

11*b*, 11*c* designate different wireless communication media having ID codes of the same kind, and the wireless communication medium 11*b* belongs to a communication range of the A antenna 19, and 11*c* belongs to a communication range of the C antenna 21. There exists no wireless communication medium in a communication range of the B antenna 20.

Here, all of the A antenna 19, the B antenna 20 and the C antenna 21 becomes active, and a transmission signal is transferred to each antenna from the reading/writing section 2 as a base point, and communication with the wireless communication media 11*b*, 11*c* is realized.

On this account, even in case that there exist a plurality of the wireless communication media 11*b*, 11*c*, it is possible to carry out communication with both sides simultaneously in parallel and to read ID codes of the both sides, since the A antenna 19 and the C antenna 21 in respective communication ranges are active, and unlike such a case that antennas are switched as in the prior art, waiting for its turn (in the prior art, it is not necessarily possible to switch from the A antenna to the C antenna 21 via a quickest route, and waiting time for its turn is elongated unnecessarily, or there is such a case that it is not possible to read out any one of the wireless communication media 11*b*, 11*c* indefinitely) is unnecessary.

By use of a timing chart of FIG. 13, an operation will be described.

In the timing chart, each signal is lined up from a left side upper stage. A horizontal axis represents a change in a time direction, and a shape of a line designates a signal wave form.

Signals are lined up from the upper stage in the order of "output signal from the reading/writing section 2", "output signal from the transmission distributor 3", "operation period signal at the A antenna 19", "operation period signal at the B antenna 20", "operation period signal at the C antenna 21", "reception signal at the A antenna 19", "reception signal at the B antenna 20", "reception signal at the C antenna 21", "combined reception signal at the reception compositor 4", "demodulated data".

Firstly, "ACK signal", which permits operation start, is outputted from the reading/writing section 2, and this "ACK signal" is transferred to all of the A antenna 19, the B antenna 20 and the C antenna 21 through the transmission distributor 3, and an operation of each antenna is started. Concretely speaking, a signal current flows through each antenna, and a magnetic field, which is generated by this means, is applied to the wireless communication media 11*b*, 11*c*, and electric power and data are applied to the wireless communication media 11*b*, 11*c*.

In addition, a zone, which is demarcated by "ACK signal" and "END signal", represents an operation period in which an operation of each antenna is permitted, and as shown by SIG3, SIG4, SIG5, respective operation permitted periods are set up at the A antenna 19, the B antenna 20 and the C antenna 21.

In this operation permitted period, electric power is supplied to the wireless communication media 11*b*, 11*c*, and in response to this, data, which is stored in memories existing in the wireless communication media 11*b*, 11*c*, causes load fluctuations of the A antenna 19 and the C antenna 21 because of mutual reactance, in response to switching etc. of internal switches, and a signal is received. As represented by SIG6, a wave form change occurs at the A antenna 19, and in the same manner, a wave form change also occurs at the C antenna 21. Here, since the wireless communication media 11*b*, 11*c* have the same ID code respectively, a wave form change with the same shape is generated. In contrast to this, a wave form fluctuation does not occur at the B antenna 20 since there exists no wireless communication medium 11 in its communication range.

SIG 6 and SIG 8 with an identical wave form are combined in the reception compositor 4 (here, as described in the implementation mode 1, they may be signals with transmission/reception frequency between an antenna and a wireless communication medium without modification, and in order to reduce noise, they may be changed to base band signals by carrying out wave detection such as rectification and down-conversion and then, combined, and by use of a reception signal amplifier, signal amplification is applied thereto), and a signal wave form, which is shown by SIG 9, is outputted to the reading/writing section 2. Since it is a wave form from the wireless communication media 11*b*, 11*c* having ID codes of the same kind, the combined composite wave form SIG 9 does not have any wave form breakup, and is outputted to the reading/writing section 2, with keeping signal wave forms which corresponded to these ID codes.

The reading/wring section 2 demodulates this by carrying out envelope detection, frequency detection, synchronous detection and so on, and digital data is extracted. In DATA 1, digital data, which is lined up in the order of "01010101", is demodulated.

DATA 1, which is this demodulated digital data, is an ID code which the wireless communication media 11*b*, 11*c* have, and the reading/writing section 2 carries out advisability authentication etc. of an ID code, and if IDs are matched, it means that both of the two wireless communication media 11*b*, 11*c* having the same ID code were ID-approved simultaneously.

For example, carried out is such processing that admission of company employees who possess both wireless communication media 11*b*, 11*c* is approved simultaneously. Alternatively, it is applied to such a case that it is judged simultaneously that commercial goods of respective wireless communication media 11*b*, 11*c* are not lifted in a shop, and so on.

Adversely, if an ID code is not appropriate, for example, a gate for entering and leaving is not opened, and a gate is kept to be closed, and in case that it is attached to a commercial good, an alarm is operated as shoplifting, which leads to appropriate processing at the time of application to security etc.

In addition, although it is not shown in FIG. 13, on the occasion of combining reception signals from the wireless communication media 11*b*, 11*c*, combining is carried out after information of which antenna of the A antenna 19 through the C antenna 21 it comes from was added, and it is outputted to the reading/writing section 2, and thereby, in the reading/writing section 2, it is possible to judge in a communication range of which antenna, ID authentication was carried out.

For example, in case that it is applied to entering and leaving security of an office floor, it becomes possible to carry out such processing that only doors, where the A antenna 19 and the C antenna 21 are disposed, are opened, and a door, where the B antenna 20 is disposed, is kept to be closed, and so on.

Alternatively, even in case that the wireless communication media 11b, 11c moved in communication ranges of the A antenna 19, the B antenna 20 and the C antenna 21, recognition is carried out in a communication range of any one of the antennas.

Next, as shown in FIG. 14, an operation of such a case that there exist the wireless communication media 11b, 11d having ID codes to be authenticated as a different kind will be described.

11b and 11d have different kind ID codes. In this way, there is such a case that wireless communication media having different ID codes exist in a communication ranges of antennas which were connected to the same wireless communication media processing apparatus, and there is a necessity to authenticate these ID codes. For example, it is such a case that ID authentication by use of a wireless communication medium is used for a number of gateway security of an office floor, and such a case that ID codes were desired to be classified and used by classification of persons who possess wireless communication media.

In the suchlike case, a given length of time is divided into time slots in advance for only classifications of ID codes which become necessary as ID authentication objects, and an authentication cycle of respective ID codes is assigned to each time slot.

For example, in case that there are sixty kinds of ID codes which require for ID authentication, and as to others than this, it is not necessary to authenticate them in a wireless communication apparatus, one minute is divided into sixty time slots (i.e., one second per one time slot), and in a certain slot, such a system that data is applied to a wireless communication medium, so as to read out only an ID code which corresponds to that slot, is used. In communication between the reading/writing section 2 and the wireless communication medium 11, data is applied to the wireless communication medium so as to read out only a certain arbitrary selected ID code, and thereby, with regard to a wireless communication medium having an ID code which does not correspond to this, data is not outputted from the wireless communication medium to an antenna. On this account, during a period of an arbitrary time slot, an antenna receives data which comes from only a wireless communication medium having an ID code which was assigned to this time slot, and it is demodulated in the reading/writing section 2.

In the reading/writing ID switch which appears in FIG. 14, it realizes to arbitrarily switches an ID code to be read out, by carrying out the suchlike switching of time slots etc. Meanwhile, the suchlike switching means to switch a communication time zone with respect to each kind of ID codes, unlike the conventional switch which selects one out of a plurality of antennas to realize switching, and therefore, all antennas are absolutely operating simultaneously, as to which there is no difference.

Meanwhile, in FIG. 16, division into time slots for the purpose of curving up time during which communication with a wireless communication medium is carried out is shown on a timing chart. In case that ID 1 through 6 are targeted as an object for ID authentication, a given length of time is divided into six time slots, and ID authentication is carried out in sequence.

As apparent from the timing chart, in a period of ID 1, a signal of only ID 1 is received by an antenna, and much the same is true on other ID 2 etc. sequentially.

Meanwhile, it is also all right even if a frequency band is divided into channels and corresponding frequency multiplex is used, as well as dividing time into time slots.

In FIG. 14, the wireless communication medium 11b has an ID code "ID_X", and the wireless communication medium 11d has an ID code "ID_Y". IN addition, the wireless communication medium 11b exists in a communication range of the A antenna 19, and the wireless communication medium 11d exists in a communication range of the C antenna 21.

Figure 15:
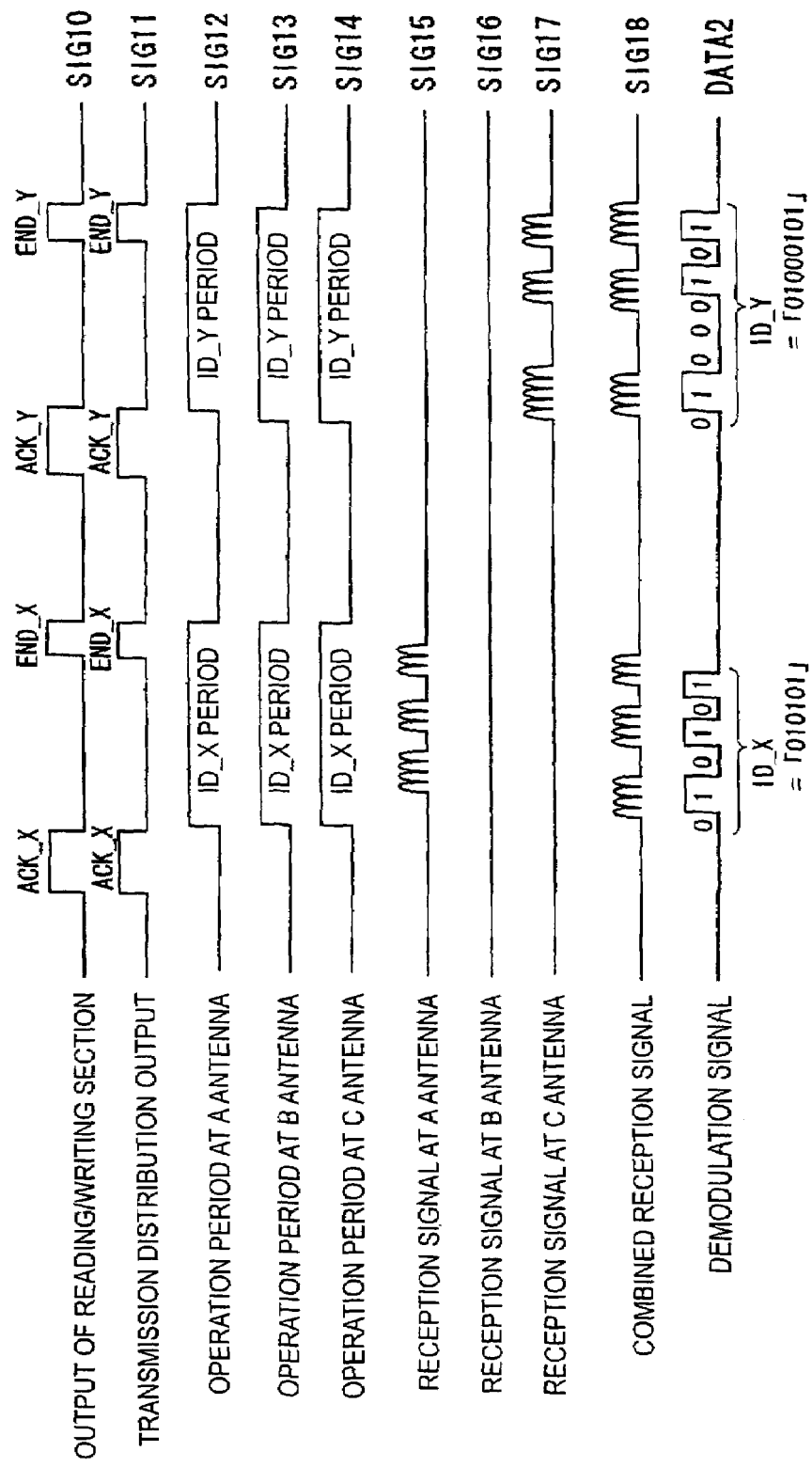
FIG. 15 is an operational timing chart in case of FIG. 14

An operation at this time is shown in a timing chart of FIG. 15.

The timing chart of FIG. 15 is such a thing that the same signals as those of FIG. 13 are lined up from a upper stage, and a horizontal axis represents a change on a time axis, and a line represents a shape of a wave form.

Firstly, in order to carry out communication with an $ID_{13}$ X, $ACK_{13}$ signal and an $END_{13}$ X signal are outputted from the reading/writing section 2, and passing through the transmission distributor 3, are outputted to each antenna. By this means, an operation permitted period signal, which carries out communication for the purpose of $ID_{13}$ X authentication, becomes active at each of the A antenna 19, the B antenna 20 and the C antenna 21. This is an "$ID_{13}$ X" period signal which is represented by SIG 12 through SIG 14.

During a period of this ID_X period signal, communication with the wireless communication medium 11b having ID_X is carried out. As shown in the timing chart of FIG. 9, a signal current flows through each antenna, and a magnetic field is generated and induced electric power is applied to each of the wireless communication media 11b, 1d, but in only the wireless communication medium 11b having the ID code of ID_X, transmission of a signal to an antenna due to load fluctuation is simply carried out.

That is, in FIG. 14, since the wireless communication medium 11b exists in a communication range of the A antenna 19, as represented by SIG 15, there occurs a change in a wave form only at the A antenna 19, and this is combined with another signal in the reception compositor 4, as a reception signal at the A antenna 19, and outputted to the reading/writing section 2. At the B antenna 20 and the C antenna 21 where there exists no wireless communication medium 11b having the ID code of ID_X, there occurs no wave form change in a signal.

On this account, in the reception compositor 4, there is no signal breakup which arises from such a matter that it is combined with a signal wave form which is composed of another ID code, and digital data is accurately demodulated in the reading/writing section 2. Here, as ID_X, it is demodulated as "010101".

On one hand, in the same manner, during such a period that an ID_Y period signal, which is a period signal for carrying out communication with an ID code of ID_Y, is active, only the wireless communication medium 11d having ID_Y transmits a signal which includes data, to an antenna, and as shown in SIG 17, a signal, in which there is a wave form change, is outputted only at the C antenna 21.

As to a signal at this C antenna 21, in the reception compositor 4, there is no breakup etc. of a signal wave form, since there exists no signal having another ID code, and finally, in the reading/writing section 2, digital data is accurately demodulated. Here, an ID code of ID_Y is "01000101", and different from ID_X.

By this means, it is possible to process, almost simultaneously, a plurality of the wireless communication media 11b, 11d having different ID codes according to need, and in addition to that, even if these are located in a communication range of any antenna which was connected to the wireless communication medium processing apparatus 1, it is possible to process it by the simultaneous operation in the same manner, and there is not such a problem that superfluous waiting time is generated, by sequentially switching antennas to be operated, as in the prior art. As a matter of course, since it is possible to carry out processing by one reading/writing section 2, low cost can be realized.

These are appropriately applicable to such a case that each antenna is disposed at a number of gateways which exist in a shop etc. to carry out entering and leaving management, to carry out shoplifting, and to carry out taking in and out management of commercial goods.

Meanwhile, FIGS. 12 through 15 show such a case that there are two wireless communication media and three antennas, but it is all right even if they are more than this, or less than this, or by use of a plurality of reading/writing sections 2, a parallel, serial hierarchical structure based on these as a base point is configured in a more complicated manner, and in this case, it becomes possible to realize more complicated processing.

Meanwhile, even in case of the implementation mode 2, a wave detection signal after wave detection is used and combined in the reception compositor, in the same manner as in the implementation mode 1, and thereby, it is possible to sufficiently avoid noise and electric power loss, and a direct current component is overlapped in advance with a signal to eliminate pulling-around of a power supply line so that a resistance property to noise is strengthened, and thereby, it is possible to realize a wireless communication medium processing apparatus, system which is far more advanced than the prior art, in which accurate demodulation is realized, and in particular, even in case of carrying out complex processing such as same kind authentication, different kind authentication, it is possible to carry out appropriate processing.

(Implementation Mode 3)

In an implementation mode 3, a wireless communication medium processing system in which a wireless communication medium processing apparatus was applied to various cases will be described.

Meanwhile, the system here is simply used for descriptive purposes as to for example, such a case that centralized processing such as a host is connected to carry out complicated processing, and such a case that it is applied to a concrete situation, and there is no particular interpretation difference between a wireless communication medium processing apparatus and a wireless communication medium processing system.

The wireless communication medium processing apparatus 1, which was described in the implementation modes 1 and 2, can be appropriately used to a certain mode in which there is a necessity to carry out management simply and accurately, by use of a wireless communication media, and it is very advantageous.

In particular, unlike the prior art, the reading/writing section can be reduced, and therefore, there is such a merit that it is of low cost, and there is no trouble to carry out simultaneous processing for a plurality of reading/writing sections, and it becomes possible to prevent erroneous reading and an erroneous operation.

In addition, unlike the prior art in which antennas to be activated are switched by a switch, a simultaneous operation is possible, and there is no necessity to chase a wireless communication medium (and a human and baggage having this) as to which there is a possibility of moving, and it is possible to surely carry out ID authentication simultaneously in parallel, and therefore, an amount of wireless communication media which can be processed at once becomes dramatically larger, and further, even in case of having different ID codes, simultaneous parallel processing is possible. Furthermore, it is also possible to avoid the problem of noise etc.

FIGS. 17, 18, 20, 21 are block diagrams of a wireless communication medium processing system in the implementation mode 3 of the invention.

Figure 17:
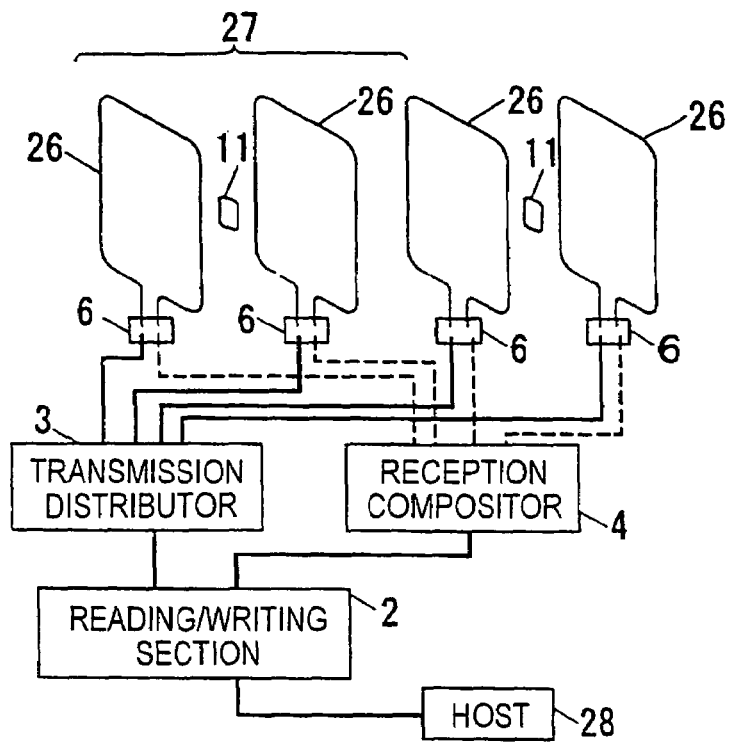
FIG. 17 is a block diagram of a wireless communication medium processing system in an implementation mode 3 of the invention.

FIG. 17 shows a case of using a gate type antenna which is used for baggage screening at an airport and a gateway of a shop etc. Meanwhile, FIGS. 17, 18 are shown as a wireless communication medium processing system to which a wireless communication medium processing apparatus was applied, but they are not limited to a system, and are shown as a wireless communication medium processing apparatus itself, and applied thereto, and therefore, in such a state that a host was removed, they are shown as a wireless communication medium processing apparatus.

Meanwhile, FIG. 17 shows three or more loop antennas (in the figure, four loop antennas 26 are shown, and such a case that there are three facing areas is shown), and simultaneous parallel communication with the wireless communication medium 11 is enabled, by such a gate type antenna that a number of loop antennas were lined up, at a shop entrance etc For example, it is suitable for such a case that it is used for a very wide entrance, and entering and leaving management and commercial good management are carried out by disposing it at a plurality of entrances, and so on.

Figure 18:
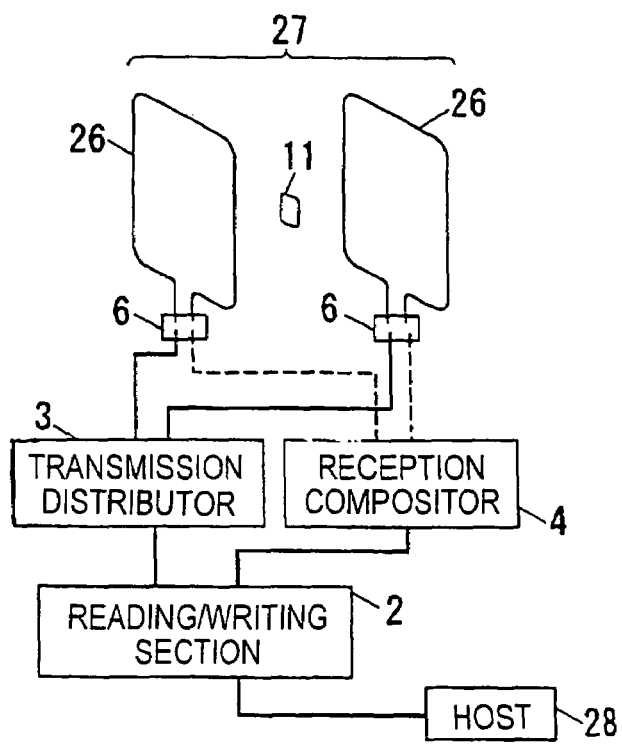
FIG. 18 is a block diagram of the wireless communication medium processing system in the implementation mode 3 of the invention

Alternatively, it is also all right even if there are only two loop antennas 26 as in FIG. 18: It is such a case that the two loop antennas 26 are set to face with each other, and communication with the wireless communication medium 11 in its facing area and its vicinity is carried out. Also in this case, a transmission signal is distributed by the transmission distributor 3 and outputted to the two loop antennas, and signals from the two loop antennas 26 are once wave-detected, and combined in the reception compositor 4 as a wave detection signal, and outputted to the reading/writing section 5, and thereby, it is possible to enable communication with the wireless communication medium 11, at any loop antenna.

For example, it is suitable for such a case that an entrance is narrow, and it is suitable to have the two antennas 26 faced with each other, and a gate type antenna is formed with respect to each entrance, and so on.

As a matter of course, it is all right even if any number of loop antennas 26 other than this are disposed.

Figure 20:
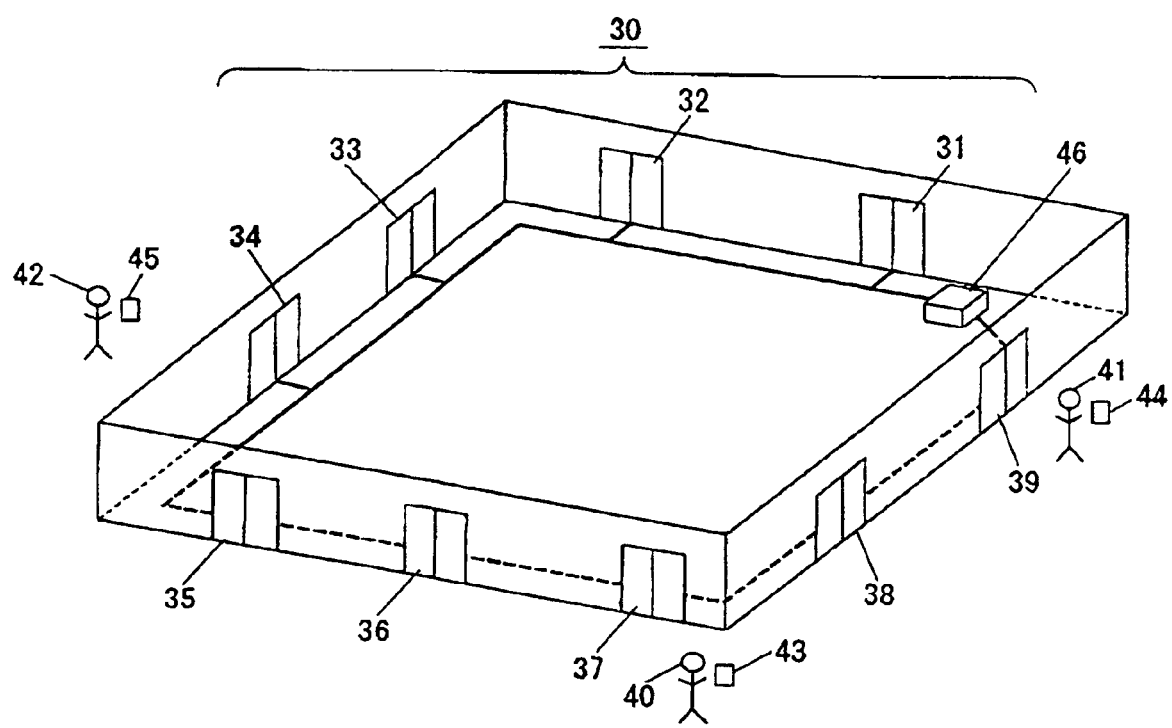
FIG. 20 is a block diagram of the wireless communication medium processing system in the implementation mode 3 of the invention

FIG. 20 shows a mode of carrying out entering and leaving management at a number of gateways which are disposed various places such as an office floor or a factor, or a classroom of a school etc., a floor of government and other public offices, a patient's room of a hospital etc., a large-size retail store.

Figure 21:
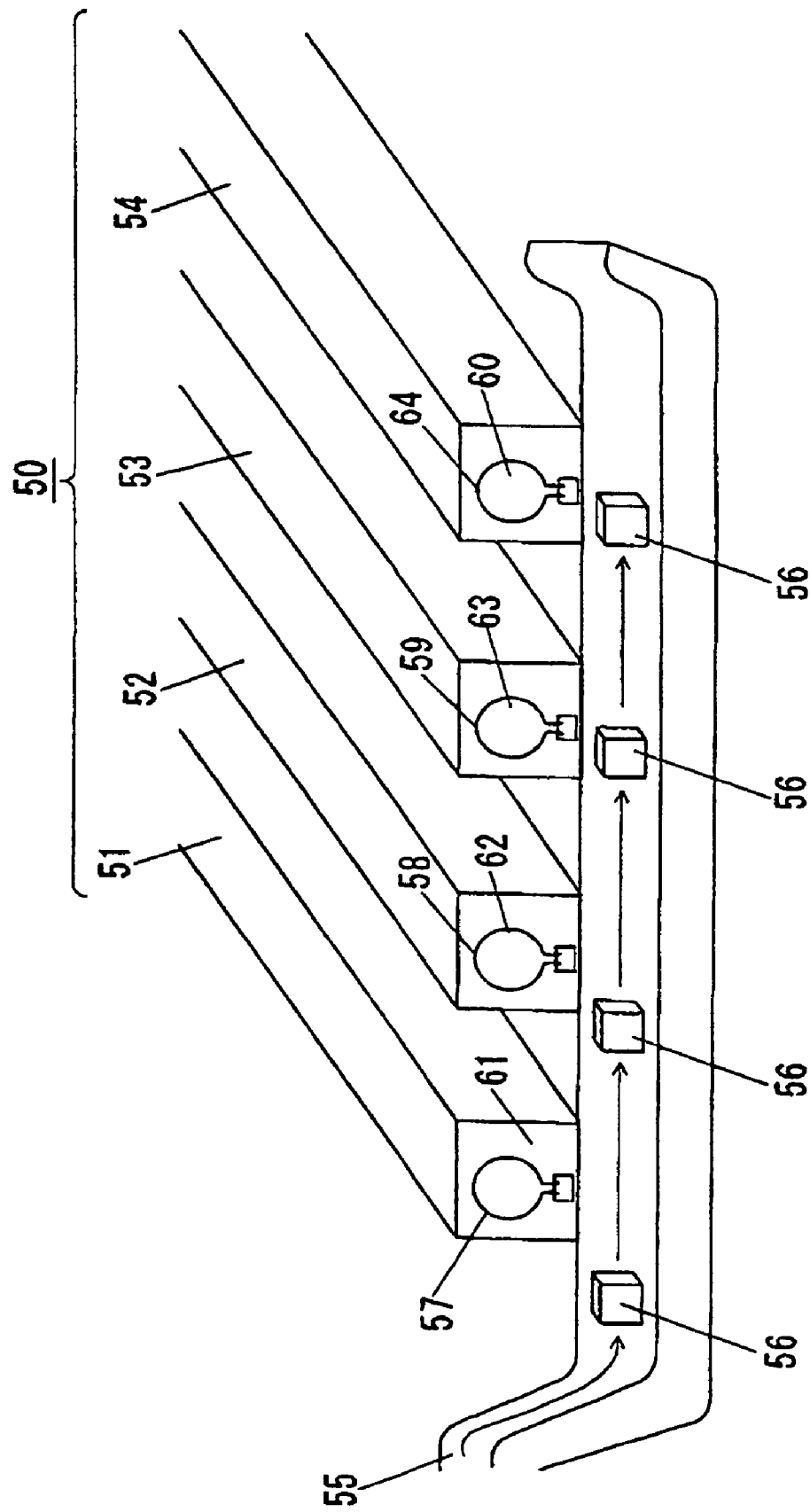
FIG. 21 is a block diagram of the wireless communication medium processing system in the implementation mode 3 of the invention
Figure 22:
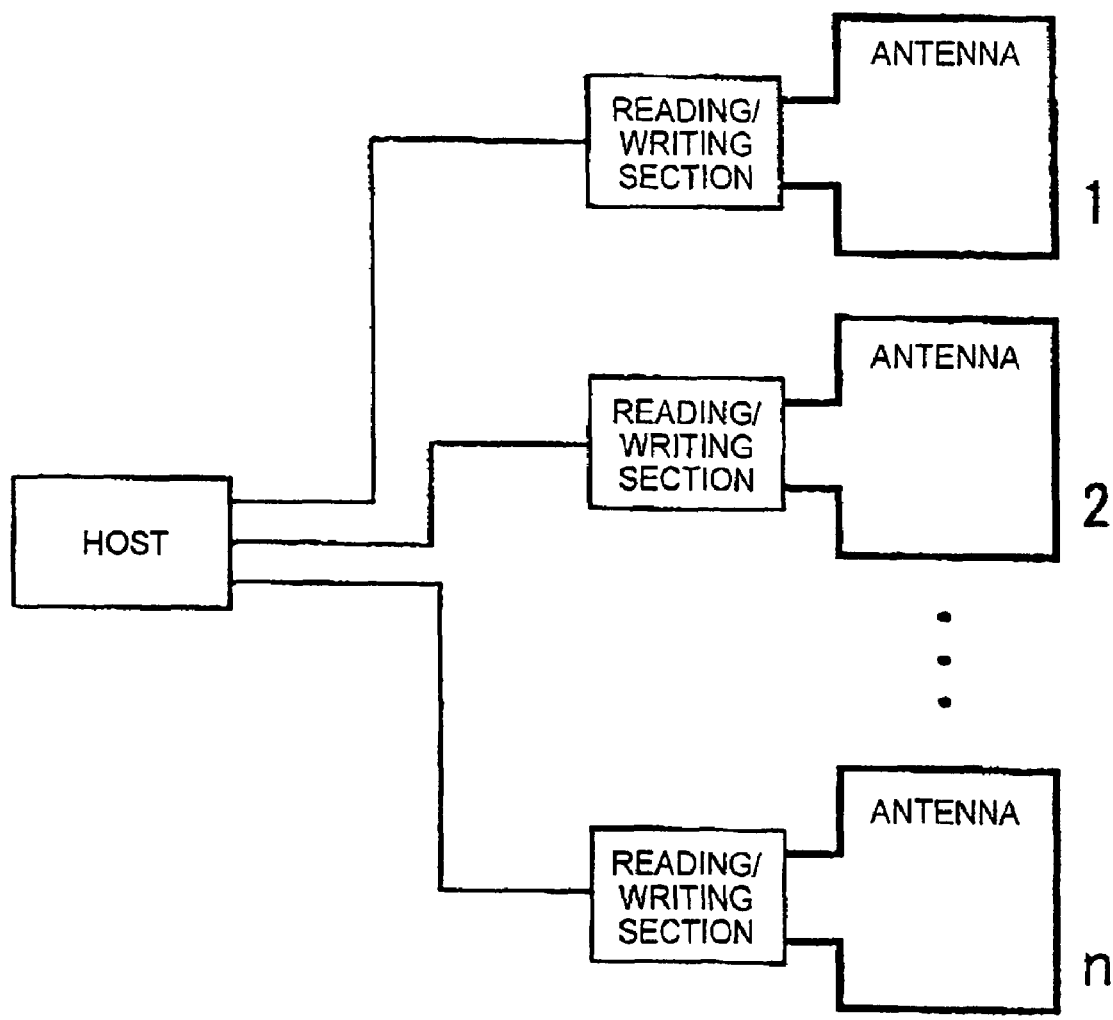
FIG. 22 is a block diagram of a wireless communication medium processing apparatus in a related art
Figure 23:
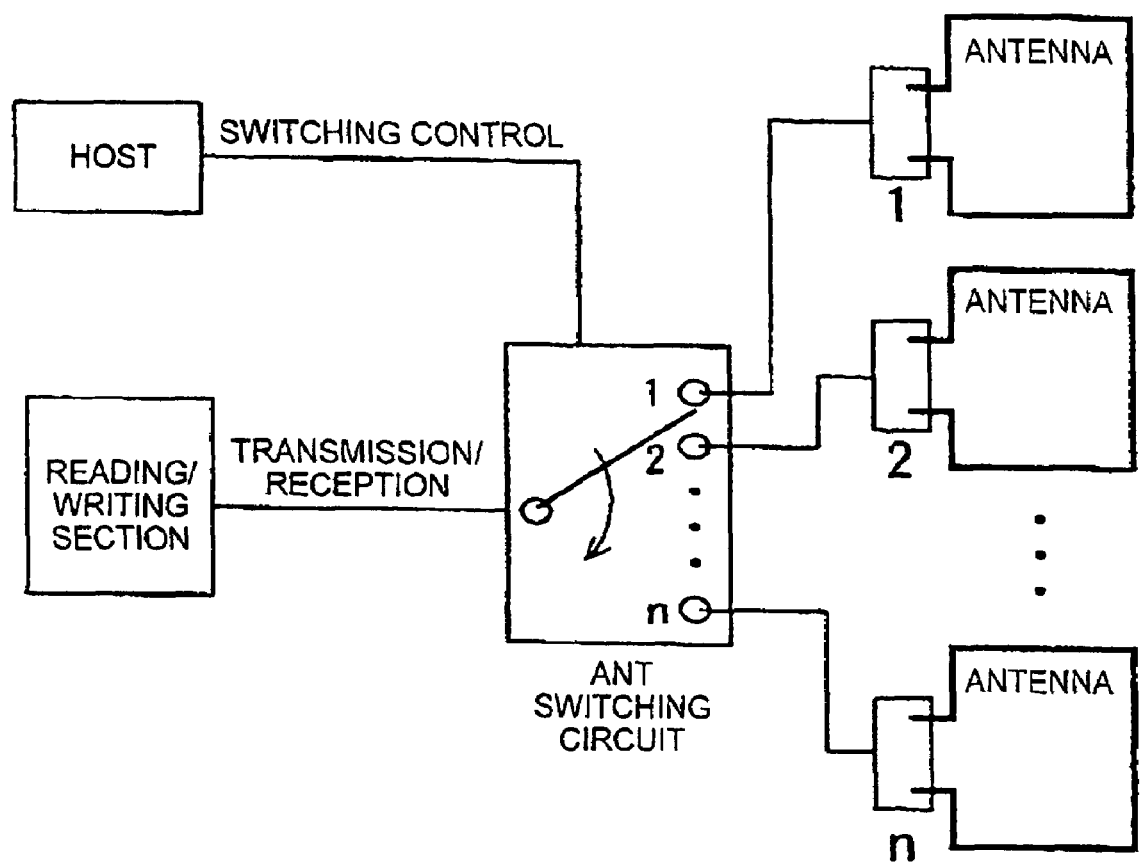
FIG. 23 is a block diagram of the wireless communication medium processing apparatus in the related art

FIG. 21 shows a wireless communication medium processing system which has a plurality of gates, and classifies and sorts commercial goods etc. to which wireless communication media were attached, with respect to each gate.

26 designates a loop antenna, and 27 designates a gate type antenna, and 28 designates a host, and 20 designates a room, and 31, 32, 33, 34, 35, 36, 37, 38, 39 designate gateways, and although they are not shown in the figure, antennas described in the implementation modes 1 and 2, which carry out communication with a wireless communication medium, are disposed at respective gateways 31 through 39.

40, 41, 42 designate humans, and 43, 44, 45 designate wireless communication media such as non-contact IC cards, ID tags, RF-ID, which carry out entering and leaving security check, respectively, or authentication bodies which stored the wireless communication media. These wireless communication media 43, 44, 45 are possessed by the humans 40 through 42, respectively.

46 designates a centralized management apparatus in which a reading/writing section, a transmission distributor, a reception compositor etc. were installed, and a transmission line and a reception line are connected from this apparatus to antennas which are disposed at respective gateways 31 through 39. At this time, as described in the implementation modes 1 and 2, a reading/writing ID code switching section and a transmission signal output selector etc. may be disposed according to need. In addition, other control, which are required for centralized management, may be disposed according to need.

All of respective gateways 31 through 39 is normally closed, and the gateways 31 through 39 are unlocked, respectively, only by ID code authentication due to communication with only a wireless communication medium having an ID code of an authentication object. This realizes such security that it is possible to screen a human who is permitted to enter into a room.

Firstly, an apparatus, a system, which are shown in FIGS. 17, 18, will be described.

The loop antenna is an antenna which has an opening portion, and in the figure, opening portions of two loop antennas 26 face with each other, and the gate type antenna 27 is configured. As a matter of course, it is all right even if there are three or more loop antennas, and in case that they face with each other, it is preferable that the opening portions are nearly in parallel, but it is all right even if they are out of alignment.

For example, in a security gate etc. at an airport, baggage and humans pass through between the loop antennas 26, and at this time, if wireless communication media are attached thereto, ID authentication is carried out by communication with this. By ID authentication, right or wrong of passing is determined. In addition, even in this case, there is such a merit that it is possible to authenticate the wireless communication media 11 which were attached to customers and baggage passing through a plurality of gate simultaneously, by having a plurality of antennas operated simultaneously in parallel by one reading/writing section, which is of very high efficiency. In particular, as described in the implementation mode 1, there is no noise by the transmission distributor 3 and the reception compositor 4, and subsequent demodulation by distribution of a transmission signal and combining of a reception signal becomes possible, and a superfluous reading/writing section 2 is not required, as in the prior art, and low cost is realized, and unnecessary processing such as synchronization processing becomes unnecessary. In addition, since there is no necessity to interchange the loop antenna 26 to be activated, there is such a merit that a large amount of processing becomes possible simultaneously in parallel.

Figure 19:
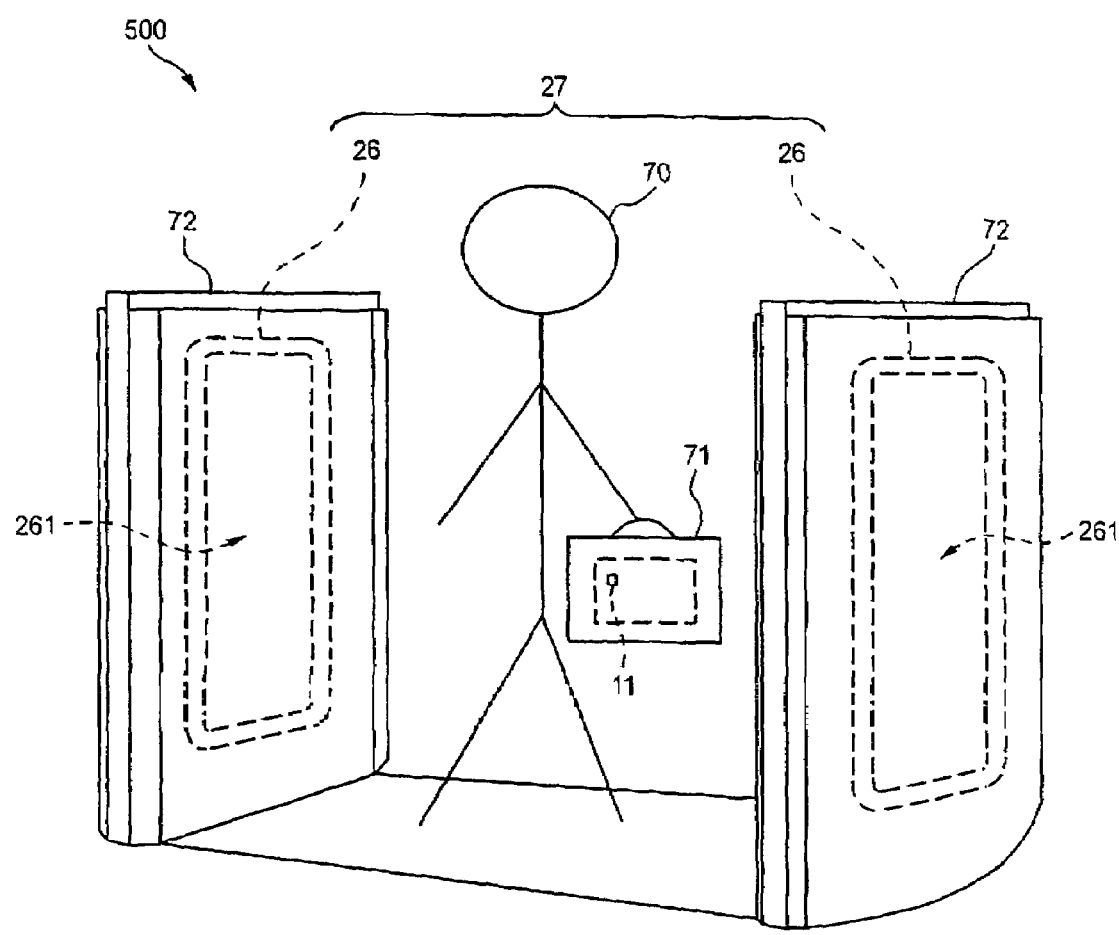
FIG. 19 is a perspective view which shows one example of a wireless communication medium processing system having a gate type antenna.

FIG. 19 is a perspective view which shows one example of a wireless communication medium processing system having a gate type antenna A wireless communication medium processing system 500 has two housings 72, as shown in FIG. 19, and these housings 72 are disposed so as to face with each other. In an inside of each housing 72, a loop antenna 26 (broken line) having an opening portion 261 is disposed. That is, these two loop antennas 26 are disposed in such a manner that the opening portions 261 of the loop antennas 26 face with each other, and thereby, a gate type antenna is configured.

When a human 70 having baggage 71 passes between the loop antennas 26, the wireless communication medium processing system 500 detected a reception signal from a wireless communication medium 11 which was attached to a document in the baggage 71, and thereby, carries out input/output authentication of the document etc. The document is an example of a physical object.

Next, an apparatus, a system, which are shown in FIG. 20, will be described.

At respective gateways 31 through 39 where antennas were disposed, a human, who has a wireless communication medium having an ID code of a unlocking available object, is ID-authenticated to realize unlocking, by carrying out communication with that wireless communication medium.

Here, it is assumed that only the wireless communication media 43, 44 are wireless communication media having ID codes of unlocking target, and the wireless communication medium 45 is a wireless communication medium having an ID code of unlocking non-target. In this case, the human 40, who came close to the gateway 37, has the wireless communication medium 43, and therefore, the gateway 37 is unlocked, and thereby, it becomes possible to walk in a room.

In the same manner, the human 41, who has the wireless communication medium 44, can walk in a room from the gateway 39.

At this time, as described in the implementation modes 1 and 2, antennas, which were disposed at respective gateways 31 through 29, operate simultaneously, and therefore, they communicate with both of the wireless communication media 43 and 44, and these reception signals are combined in the reception compositor, and then, demodulated in the reading/writing section 2. It is authenticated whether demodulated digital data is of a correct ID code, and by this means, the gateways 37, 39 are unlocked, and the humans 41, 42 can walk through gates.

Meanwhile, as described in the implementation mode 2, even if the wireless communication media 43, 44 have different ID codes, it is possible to carry out simultaneous processing, by a time slot system with time division and a channel system with frequency division etc.

On one hand, as to the wireless communication medium 45 having an ID code which is not permitted in this room 30, the ID code is not authenticated as a result of communication, and therefore, the gateway 34 is not unlocked, and the human 42 can not walk in a room. This is the same even if an entrance is changed.

In this way, it is possible to secure security.

Meanwhile, at this time, it is all right even if only a specific gateway uses a security system which corresponds only to a wireless communication medium having a specific ID code, by changing over an ID code to be authenticated by a gateway. This is effective to such a case that an inside of the room 30 is further broken into parts, and so on.

In addition, unlike FIGS. 17, 18, it is all right even if there are much more wireless communication media, and it is also all right even if someone walks in a room from another gateway. In addition, much the same is true on leaving a room.

In addition, it is also suitable to carry out an emergency countermeasure such as changing an ID code of authentication target by a data change in the centralized processing apparatus 46, and non-unlocking all gateways in a specific state.

In addition, the suchlike managed room 30 is further built up as one unit, and thereby, it is possible to build up a wider area wireless communication medium processing system.

The suchlike wireless communication medium processing system is applied to a security system using wireless communication media, for an office etc.

Next, an apparatus, a system, which are shown in FIG. 21, will be described.

FIG. 21 shows a wireless communication medium processing system which has a plurality of gates, and classifies and sorts commercial goods etc. to which wireless communication media were attached, with respect to each gate.

50 designates a wireless communication medium processing system, and one example of a commercial good automatic sorting system etc. which are used for commercial good sorting.

51, 52, 53, 54 designate sorting paths. 55 designates a passage, and 56 designates a commercial good, which is an example of physical object, to a wireless communication medium is attached, and 57, 58, 59, 60 designate antennas, and 61, 62, 63, 64 designate entrances, and although they are not shown in the figure, all antennas 57 through 60 are connected to a centralized processing apparatus which is composed of a reading/writing section, a reception compositor, a transmission distributor and so on.

A wireless communication medium having an arbitrary ID code is attached to the commercial good 56, and moves on the passage 55 which is composed of a belt conveyer etc. The antennas 57 through 60 are controlled so as to communicate with wireless communication media having different ID code, respectively (as in the implementation mode 2), and communication with a wireless communication medium of a commercial good, which moves on the passage 55 movable like a belt conveyer, is carried out sequentially.

At this time, in case that a wireless communication medium, which corresponds to an ID code to be authenticated by any one of the antennas 57 through 60, is attached to the commercial good 56, that commercial good 56 is taken in any one of the entrances 61 through 64 where that antenna is disposed, and sorted in any one of the sorting paths 51 through 54, and automatic sorting of commercial goods becomes possible.

For example, in this case, processing is carried out sequentially by carving up by time slot unit in such a manner only the antenna 57 communicates with a certain ID code 1, and only the antenna 58 communicates with another ID code 2, and thereby, the suchlike automatic sorting is realized.

As above, as shown in FIGS. 17, 18 and 20, as a principle, one reading/writing section is used for entering and leaving security of an office etc., and automatic sorting of commercial goods, etc., to enable communication with a wireless communication medium at a number of gateways where antennas were disposed, etc., and it becomes possible to realize a processing system which is of very low cost and does not need a complicated circuit structure such as synchronizing processing.

In addition, unlike the prior art where antennas to be activated are switched sequentially, it is possible to process data from a plurality of wireless communication media simultaneously by the reception compositor, by having all or arbitrarily selected antennas operated simultaneously, and therefore, entering and leaving are realized simultaneously, and it becomes easily possible to realize sorting of a number of commercial goods, and so on. Further, by excluding a base band signal, it is also possible to prevent noise from being generated.

Meanwhile, even in case of the implementation mode 3, in the same manner as in the implementation modes 1 and 2, a wave detection signal after wave detection is used and combined in the reception compositor so that it is possible to sufficiently avoid noise and electric power loss, and a direct current component is overlapped in advance with a signal to eliminate pulling-around of a power supply line and to strengthen a resistance property to noise so that accurate demodulation is realized, and in particular, even in case of carrying out complicated processing such as same kind authentication and different kind authentication, it is possible to carry out appropriate processing. It is possible to realize a wireless communication medium processing apparatus, system which were far more advanced than the prior art.

The invention has a plurality of antennas, a transmission distributor which is connected to the plurality of antennas, a reception compositor which is connected to the plurality of antennas, and a reading/writing section which is connected to the transmission distributor and the reception compositor and caries out reading or writing, or reading/writing of data with a wireless communication medium through the antenna, and by such a configuration that a wave detection signal after wave detection is inputted to the reception compositor, it is applicable also to an application in which it is necessary to carry out communication with a plurality of wireless communication media simultaneously in parallel and ID authentication thereof, at low cost and with low noise, by at least one reading/writing section.

This application is based upon and claims the benefit of priority of Japanese Patent Application No. 2004-049666 filed on Apr. 25, 2002, the content of which are incorporated herein by references in its entirety.

What is claimed is:

1. A wireless communication medium processing apparatus which carries out communication with a wireless communication medium, said apparatus comprising:
   a section that performs reading/writing processing as to information which is stored in the wireless communication medium, said section comprising:
   a plurality of antennas;
   a transmission distributor, which is connected to the plurality of antennas; and
   a reception compositor, which is connected to the plurality of antennas;
   wherein the transmission distributor distributes respective signals, that are based on an input signal, to the plurality of antennas; and
   the reception compositor combines signals from the plurality of antennas, and outputs a composite signal.

2. The wireless communication medium processing apparatus according to claim 1, further comprising:
   at least one wave detector, which detects a wave detection signal from a signal from at least one of the antennas, and
   wherein, in a case that at least two wave detectors detect wave detection signals from at least two of the antennas, the reception compositor combines the wave detection signals detected by the at least two wave detectors, and outputs a composite signal.

3. The wireless communication medium processing apparatus according to claim 2, wherein the at least one wave detector is installed on the antenna.

4. The wireless communication medium processing apparatus according to claim 2, wherein the at least one wave detector includes a rectifier.

5. The wireless communication medium processing apparatus according to claim 2, wherein the at least one wave detector includes a down-conversion section.

6. The wireless communication medium processing apparatus according to claim 2, wherein the wave detection signal is a base band signal.

7. The wireless communication medium processing apparatus according to claim 1, further comprising:
a at least one reception signal amplifier which amplifiers a signal from at least one of the antennas, and
wherein, in a case that at least two reception signal amplifiers amplify signals from at least two of the antennas, the reception compositor combines signals amplified by the at least two reception signal amplifiers, and outputs a composite signal.

8. The wireless communication medium processing apparatus according to claim 1, further comprising:
a transmission signal amplifier, which amplifies a signal which is divided by the transmission distributor.

9. The wireless communication medium processing apparatus according to claim 1, wherein the transmission distributor and the reception compositor are disposed one for each.

10. The wireless communication medium processing apparatus according to claim 1, wherein the signal is overlapped with a direct current component.

11. The wireless communication medium processing apparatus according to claim 1, wherein the transmission distributor includes an electric power controller which controls electric power of the signal, in accordance with a position of the antenna or a shape of the antenna.

12. The wireless communication medium processing apparatus according to claim 1, comprising:
a reading/writing section which is connected to both the transmission distributor and the reception compositor, and wherein the reading/writing section carries out the reading/writing processing, with the wireless communication medium which stores a certifiable ID code.

13. The wireless communication medium processing apparatus according to claim 12, wherein the reading/writing section includes a reading/writing ID switch;
wherein the reading/writing ID switch switches the reading/writing processing which is carried out with a wireless communication medium which stores the ID code to be authenticated as the same kind, and
the reading/writing processing which is carried out with a wireless communication medium which stores the ID code to be authenticated as a different kind.

14. The wireless communication medium processing apparatus according to claim 12, wherein the reading/writing ID switch carries out the reading/writing processing which is carried out with a wireless communication medium which stores an ID code to be authenticated as a different kind, by a time slot which is time-divided with respect to each the ID code.

15. The wireless communication medium processing apparatus according to claim 1, wherein at least two of the plurality of antennas are loop antennas including an opening portion; and
the at least two loop antennas are disposed in such a manner that the opening portions face with each other.

16. A wireless communication medium processing system, comprising:
the wireless communication medium processing apparatus according to claim 1; and
a gateway;
wherein the plurality of antennas is disposed at the gateway.

17. The wireless communication medium processing system according to claim 16, wherein:
in case that ID authentication is carried out as a result of communication between the antenna which is disposed at the gateway and the wireless communication medium, the gateway is unlocked.

18. The wireless communication medium processing system according to claim 16, further comprising:
a plurality of the gateways;
wherein an arbitrary antenna among the plurality of antennas which is disposed at the plurality of gateways can be selected as an antenna which does not carry out communication, in advance.

19. The wireless communication medium processing system according to claim 16, further comprising:
sorting paths which are disposed at the gateways, respectively.

20. The wireless communication medium processing system according to claim 19,
wherein in case that ID authentication is carried out as a result of communication between the antenna which is disposed at the gateway and a wireless communication medium, a physical object to which the wireless communication medium is attached is sorted in the sorting path which is disposed at the gateway.

21. The wireless communication medium processing system according to claim 20, wherein the physical object is a commercial good.

22. A wireless communication medium processing apparatus which carries out communication with a wireless communication medium, said apparatus comprising:
a section that performs reading/writing processing as to information which is stored in the wireless communication medium, said section comprising:
a plurality of antennas;
a reception signal input selector, which is connected to the plurality of antennas and selects at least one antenna from the plurality of antennas, and
a wave detector, which is installed between the at least one antenna and the reception signal input selector, and detects a wave detection signal from signals from the at least one antenna.

23. The wireless communication medium processing apparatus according to claim 22, wherein the wave detector is installed on the at least one antenna.

24. The wireless communication medium processing apparatus according to claim 22, wherein the wave detector includes a rectifier.

25. The wireless communication medium processing apparatus according to claim 22, wherein the wave detector includes a downconversion section.

26. The wireless communication medium processing apparatus according to claim 22, wherein the wave detection signal is a base band signal.

27. The wireless communication medium processing apparatus according to claim 22, further comprising:
a reception signal amplifier which amplifiers the signal from the at least one antenna.

28. The wireless communication medium processing apparatus according to claim 22, wherein the reception signal input selector is one.

29. The wireless communication medium processing apparatus according to claim 22, wherein the signal is overlapped with a direct current component.

30. The wireless communication medium processing apparatus according to claim 22, further comprising:
an electric power calculator which calculates electric power of the signal from the antenna; and wherein the reception signal input selector selects the at least one antenna from the plurality of antennas, in accordance with the electric power of the signal which is calculated by the electric power calculator.

31. The wireless communication medium processing apparatus according to claim 22, further comprising:
a reading/writing section, which is connected to the reception signal input selector, and
in which the reading/writing section carries out the reading/writing processing, with the wireless communication medium which stores a certifiable ID code.

32. The wireless communication medium processing apparatus according to claim 31, wherein the reading/writing section includes a reading/writing ID switch;
wherein the reading/writing ID switch switches the reading/writing processing which is carried out with a wireless communication medium which stores the ID code to be authenticated as the same kind; and
the reading/writing processing which is carried out with a wireless communication medium which stores the ID code to be authenticated as a different kind.

33. The wireless communication medium processing apparatus according to claim 31, wherein the reading/writing ID switch carries out the reading/writing processing which is carried out with a wireless communication medium which stores an ID code to be authenticated as a different kind, by a time slot which was time-divided with respect to each the ID code.

34. The wireless communication medium processing according to claim 22, wherein at least two of the plurality of antennas are loop antennas including an opening portion; and
the at least two loop antennas are disposed in such a manner that the opening portions face with each other.

35. A wireless communication medium processing system, comprising:
the wireless communication medium processing apparatus as set forth in claim 22; and
a gateway,
wherein the plurality of antennas is disposed at the gateway.

36. The wireless communication medium processing system according to claim 35, wherein,
in case that ID authentication is carried out as a result of communication between the antenna which is disposed at the gateway and the wireless communication medium, the gateway is unlocked.

37. The wireless communication medium processing system according to claim 35, further comprising:
a plurality of the gateways;
wherein, an arbitrary antenna among the plurality of antennas which is disposed at the plurality of gateways can be selected as an antenna which does not carry out communication, in advance.

38. The wireless communication medium processing system according to claim 35, further comprising:
sorting paths which are disposed at the gateways, respectively.

39. The wireless communication medium processing system according to claim 38, wherein:
in case that ID authentication is carried out as a result of communication between the antenna which is disposed at the gateway and a wireless communication medium, a physical object to which the wireless communication medium is attached is sorted in the sorting path which is disposed at the gateway.

40. The wireless communication medium processing system according to claim 39, wherein the physical object is a commercial good.

41. A wireless communication medium processing apparatus which carries out communication with a wireless communication medium, said apparatus comprising:
a section that performs at least reading processing as to information which is stored in the wireless communication medium by generating induced voltage in the wireless communication medium, said section comprising:
a plurality of antennas which respectively perform both transmission and reception;
a transmission distributor, which is connected to the plurality of antennas; and
a reception compositor, which is connected to the plurality of antennas, wherein:
the transmission distributor distributes transmission signals to the plurality of antennas in parallel,
said plurality of antennas, respectively, transmit the distributed transmission signals to space around said plurality of antennas where the wireless communication medium may be located,
at least one of the plurality of antennas receives a reception signal from the wireless communication medium if the wireless communication medium is located around the plurality of antennas and outputs the reception signal to the reception compositor,
at least two antennas of the plurality of antennas receive a reception signal from the wireless communication medium and output the reception signal to the reception compositor, and
in a case that a first antenna and a second antenna of the plurality of antennas receive and output a first reception signal and a second reception signal, respectively, the reception compositor combines the first reception signal and the second reception signal and outputs a combined reception signal.

42. A wireless communication medium processing apparatus which carries out communication with a wireless communication medium, said apparatus comprising:
a section that performs at least reading processing as to information which is stored in the wireless communication medium by generating induced voltage in the wireless communication medium, said section comprising:
a plurality of antennas;
a reception signal input selector, which is connected to the plurality of antennas and selects at least a first antenna of the plurality of antennas, and
a plurality of wave detectors, which are connected to the reception signal input selector so that the wave detectors are respectively installed between the plurality of antennas and the reception signal input selector, wherein:
the first antenna, which is selected by the reception signal input selector, receives a RF signal and outputs the RF signal to one of the plurality of wave detectors, and the one of the plurality of wave detectors detects a wave detection signal whose frequency is lower than the RF signal.

43. A wireless communication medium processing apparatus which carries out communication with a wireless communication medium, said apparatus comprising:
a section that performs at least reading processing by generating induced voltage in the wireless communication medium, said section comprising:

a plurality of antennas;
a transmission distributor, which is connected to the plurality of antennas; and
a reception compositor, which is connected to the plurality of antennas;
wherein the transmission distributor distributes respective signals, that are based on an input signal, to the plurality of antennas; and
the reception compositor combines signals from the plurality of antennas, and outputs a composite signal.

44. A wireless communication medium processing apparatus which carries out communication with a wireless communication medium, said apparatus comprising:
a section that performs at least reading processing by generating induced voltage in the wireless communication medium, said section comprising:
a plurality of antennas;
a reception signal input selector, which is connected to the plurality of antennas and selects at least one antenna from the plurality of antennas, and
a wave detector, which is installed between the at least one antenna and the reception signal input selector, and detects a wave detection signal from a signal from the at least one antenna.

* * * * *